(12) United States Patent
Gnedin et al.

(10) Patent No.: US 10,768,810 B2
(45) Date of Patent: Sep. 8, 2020

(54) ENHANCED KEYBOARD INCLUDING MULTIPLE APPLICATION EXECUTION

(71) Applicant: HYPERKEY, INC., San Francisco, CA (US)

(72) Inventors: Nikita Gnedin, San Francisco, CA (US); Stuart Gannes, San Francisco, CA (US)

(73) Assignee: Hyperkey, Inc., San Francisco, CA (US)

( * ) Notice: Subject to any disclaimer, the term of this patent is extended or adjusted under 35 U.S.C. 154(b) by 0 days.

(21) Appl. No.: 15/550,767

(22) PCT Filed: Feb. 10, 2017

(86) PCT No.: PCT/US2017/017431
§ 371 (c)(1),
(2) Date: Aug. 11, 2017

(87) PCT Pub. No.: WO2017/139619
PCT Pub. Date: Aug. 17, 2017

(65) Prior Publication Data
US 2018/0113609 A1    Apr. 26, 2018

Related U.S. Application Data

(60) Provisional application No. 62/384,368, filed on Sep. 7, 2016, provisional application No. 62/358,266, filed
(Continued)

(51) Int. Cl.
*G06F 3/0488* (2013.01)
*H04L 12/58* (2006.01)
(Continued)

(52) U.S. Cl.
CPC ...... *G06F 3/04886* (2013.01); *G06F 3/04883* (2013.01); *G06F 3/04817* (2013.01);
(Continued)

(58) Field of Classification Search
CPC ............... G06F 3/04886; G06F 3/0482; G06F 3/04883; G06F 3/04817; G06F 17/24;
(Continued)

(56) References Cited

U.S. PATENT DOCUMENTS 6,268,806 B1  7/2001 Frager et al.
6,895,501 B1  5/2005 Salowey
(Continued)

FOREIGN PATENT DOCUMENTS

CN  102339437 A  2/2012

OTHER PUBLICATIONS

ISR and Written Opinion, PCT/US17/17431, dated Jul. 5, 2017.
(Continued)

*Primary Examiner* — Andrew L Tank
(74) *Attorney, Agent, or Firm* — Rimon Law Firm

(57) ABSTRACT

A default virtual interface is replaced by an adapted interface to an independent application. The adapted interface allows one (dependent) application to be accessed from within a second (independent) application. This allows, for example, a game application to be executed within a text messaging application. Output of the dependent application can be conveyed to the base application. The adapted user interface optionally includes a plurality of shortcut keys each represented by a different shortcut icon. One or more of the shortcut keys are optionally configured for sharing the dependent and/or independent applications with remote devices. Content shared via the virtual interface is optionally provided as a data stream and is optionally mapped to a social network, such sharing can be tracked across social networks.

32 Claims, 11 Drawing Sheets

Related U.S. Application Data on Jul. 5, 2016, provisional application No. 62/293,893, filed on Feb. 11, 2016.

(51) Int. Cl.
*G06F 3/0481* (2013.01)
*G06F 17/24* (2006.01)
*G06Q 30/02* (2012.01)
*G06Q 50/00* (2012.01)
*G06F 40/166* (2020.01)

(52) U.S. Cl.
CPC ....... *G06F 40/166* (2020.01); *G06Q 30/0267* (2013.01); *G06Q 30/0277* (2013.01); *G06Q 50/01* (2013.01); *H04L 51/10* (2013.01); *H04L 51/32* (2013.01)

(58) Field of Classification Search
CPC .... G06O 2203/04803; H04M 1/72552; H04M 1/72547; G06Q 30/0267; G06Q 30/0277; G06Q 50/01; H04L 51/10; H04L 51/32
See application file for complete search history.

(56) References Cited

U.S. PATENT DOCUMENTS

| | | | |
|---|---|---|---|
| 9,389,783 B2* | 7/2016 | Kwahk | G06F 3/04886 |
| 9,417,793 B2* | 8/2016 | Kay | G06F 3/0489 |
| 2003/0004983 A1 | 1/2003 | Cohen | |
| 2004/0032398 A1 | 2/2004 | Ariel et al. | |
| 2004/0217939 A1 | 11/2004 | Levy et al. | |
| 2006/0218320 A1 | 9/2006 | Avraham et al. | |
| 2007/0013673 A1 | 1/2007 | Minari | |
| 2007/0109276 A1 | 5/2007 | Kim et al. | |
| 2008/0303793 A1 | 12/2008 | Carroll | |
| 2010/0088387 A1 | 4/2010 | Calamera | |
| 2010/0153884 A1 | 6/2010 | Chow et al. | |
| 2010/0205559 A1 | 8/2010 | Rose | |
| 2010/0241983 A1 | 9/2010 | Walline et al. | |
| 2010/0269048 A1 | 10/2010 | Pahlavan et al. | |
| 2012/0017178 A1 | 1/2012 | Mulloy et al. | |
| 2012/0019540 A1* | 1/2012 | Yaksick | G06F 3/04883 345/473 |
| 2012/0102428 A1 | 4/2012 | Stewat | |
| 2012/0110486 A1 | 5/2012 | Sirpal et al. | |
| 2012/0235921 A1* | 9/2012 | Laubach | G06F 3/0238 345/172 |
| 2012/0266079 A1 | 10/2012 | Lee et al. | |
| 2012/0271718 A1 | 10/2012 | Chung | |
| 2013/0033971 A1 | 2/2013 | Stier | |
| 2013/0050093 A1 | 2/2013 | Kim et al. | |
| 2013/0082935 A1* | 4/2013 | Duggan | G06F 3/04886 345/172 |
| 2013/0124640 A1 | 5/2013 | Franco et al. | |
| 2013/0132861 A1 | 5/2013 | Kienzle et al. | |
| 2013/0154937 A1 | 6/2013 | Park | |
| 2013/0283195 A1 | 10/2013 | Bilgen et al. | |
| 2013/0339872 A1 | 12/2013 | Shuster et al. | |
| 2014/0019976 A1 | 1/2014 | Naito | |
| 2014/0025727 A1 | 1/2014 | Ahn et al. | |
| 2014/0059491 A1 | 2/2014 | Kim et al. | |
| 2014/0136990 A1* | 5/2014 | Gonnen | H04L 51/18 715/752 |
| 2014/0173460 A1 | 6/2014 | Kim | |
| 2014/0223372 A1* | 8/2014 | Dostie | G06F 3/0482 715/813 |
| 2014/0230037 A1 | 8/2014 | Nicholas, III et al. | |
| 2015/0084871 A1 | 3/2015 | Yarvis et al. | |
| 2015/0156098 A1 | 6/2015 | Richards et al. | |
| 2015/0347005 A1* | 12/2015 | Hou | G06F 3/04886 715/773 |
| 2016/0006856 A1* | 1/2016 | Bruno | H04M 1/72547 715/809 |
| 2016/0110754 A1 | 4/2016 | Miyazaki et al. | |
| 2016/0274789 A1* | 9/2016 | Park | G06F 3/04886 |
| 2016/0335532 A1 | 11/2016 | Sanghavi et al. | |
| 2017/0097765 A1* | 4/2017 | Chao | G06F 3/04886 |
| 2017/0102870 A1 | 4/2017 | Won | |
| 2017/0102871 A1* | 4/2017 | Won | G06F 3/0481 |
| 2017/0109780 A1 | 4/2017 | Moore et al. | |
| 2017/0131870 A1* | 5/2017 | Harper | G06F 3/04817 |
| 2017/0308291 A1 | 10/2017 | Luipold | |

OTHER PUBLICATIONS

U.S. Appl. No. 15/675,698 Non-Final Office Action dated Nov. 9, 2017.
U.S. Appl. No. 15/675,706 Non-Final Office Action dated Nov. 22, 2017.
U.S. Appl. No. 15/675,698 Amendment B—Response to Non-Final Office Action Issued Nov. 9, 2017, dated Jan. 9, 2018.
U.S. Appl. No. 15/675,706 Amendment B—Response to Non-Final Office Action Issued Nov. 22, 2017, dated Nov. 29, 2017.
U.S. Appl. No. 15/675,686 Non-Final Office Action, dated Nov. 1, 2018.
U.S. Appl. No. 15/675,686 Amendment A, Submitted Mar. 1, 2019.
U.S. Appl. No. 15/675,686 Final Rejection, dated Mar. 29, 2019.
U.S. Appl. No. 15/675,686 Amendment B, Submitted Jul. 1, 2019.
U.S. Appl. No. 15/675,686 Advisory Action, dated Jul. 30, 2019.
U.S. Appl. No. 15/676,856 Non-Final Office Action, dated Aug. 6, 2019.
EP17750855, Extended European Search Report, dated Aug. 16, 2019.

* cited by examiner

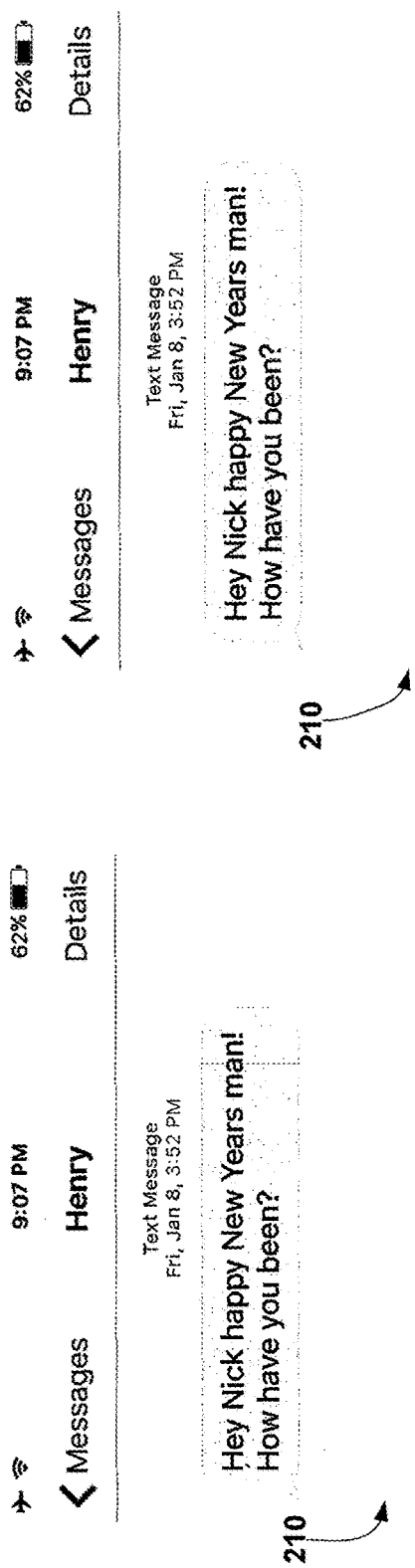
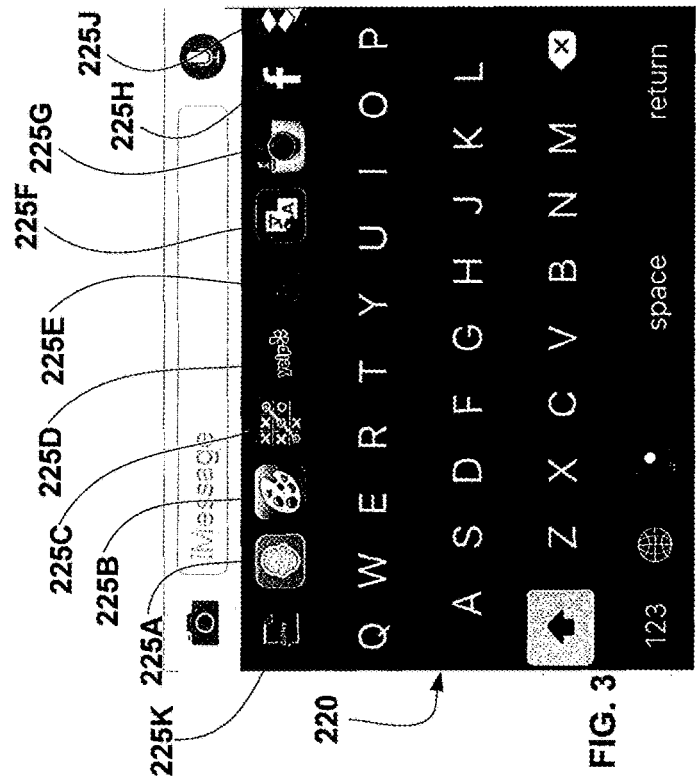
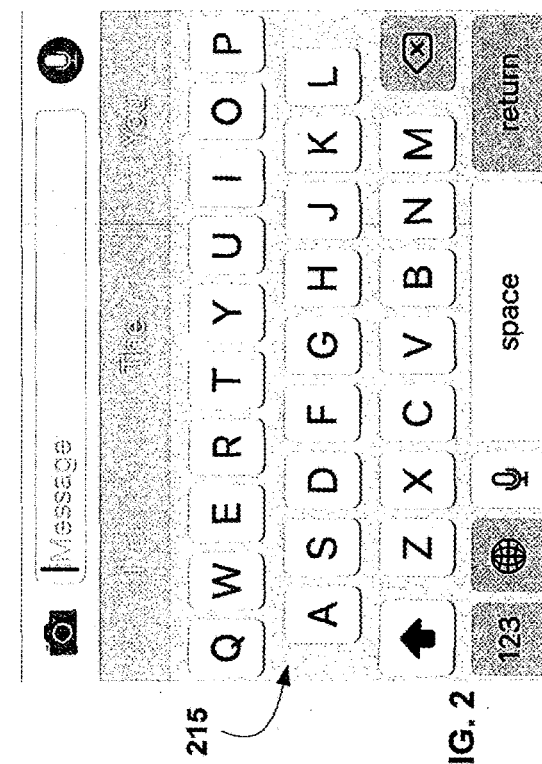
FIG. 2
FIG. 3

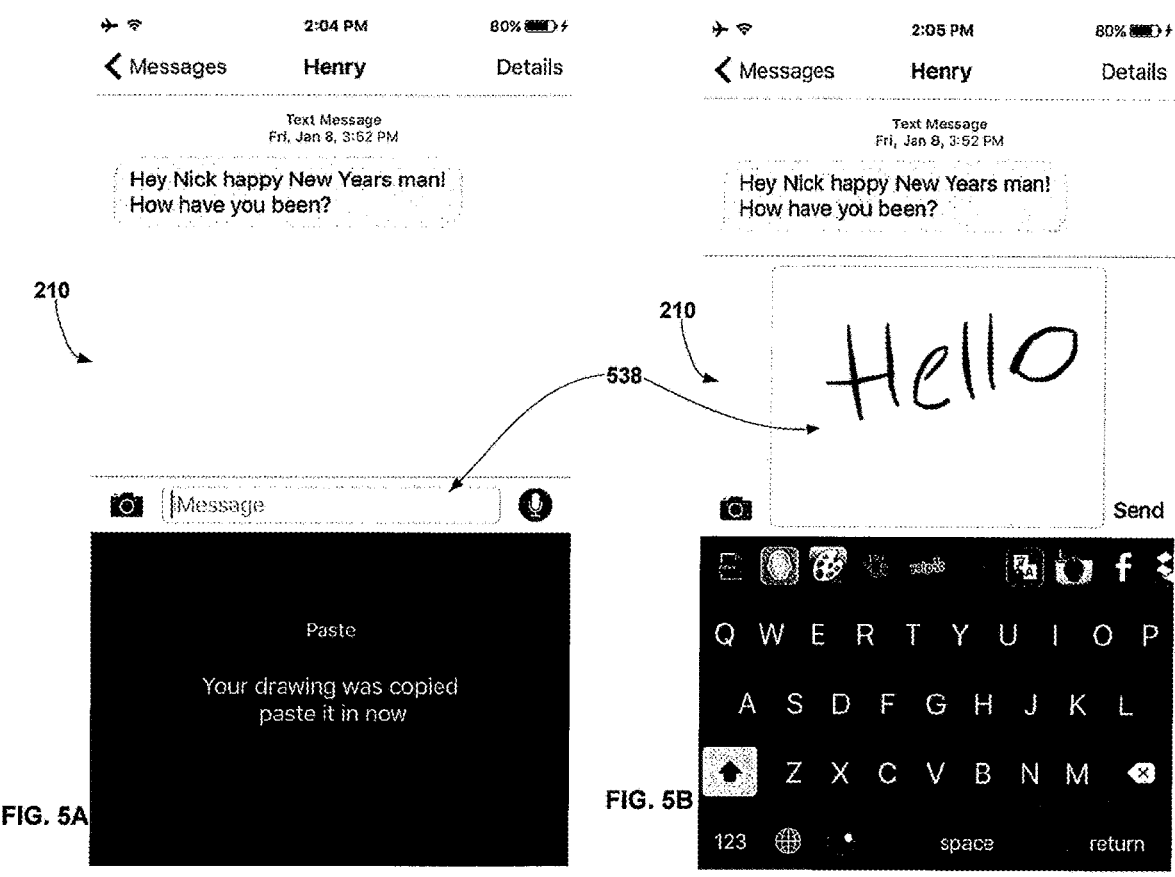

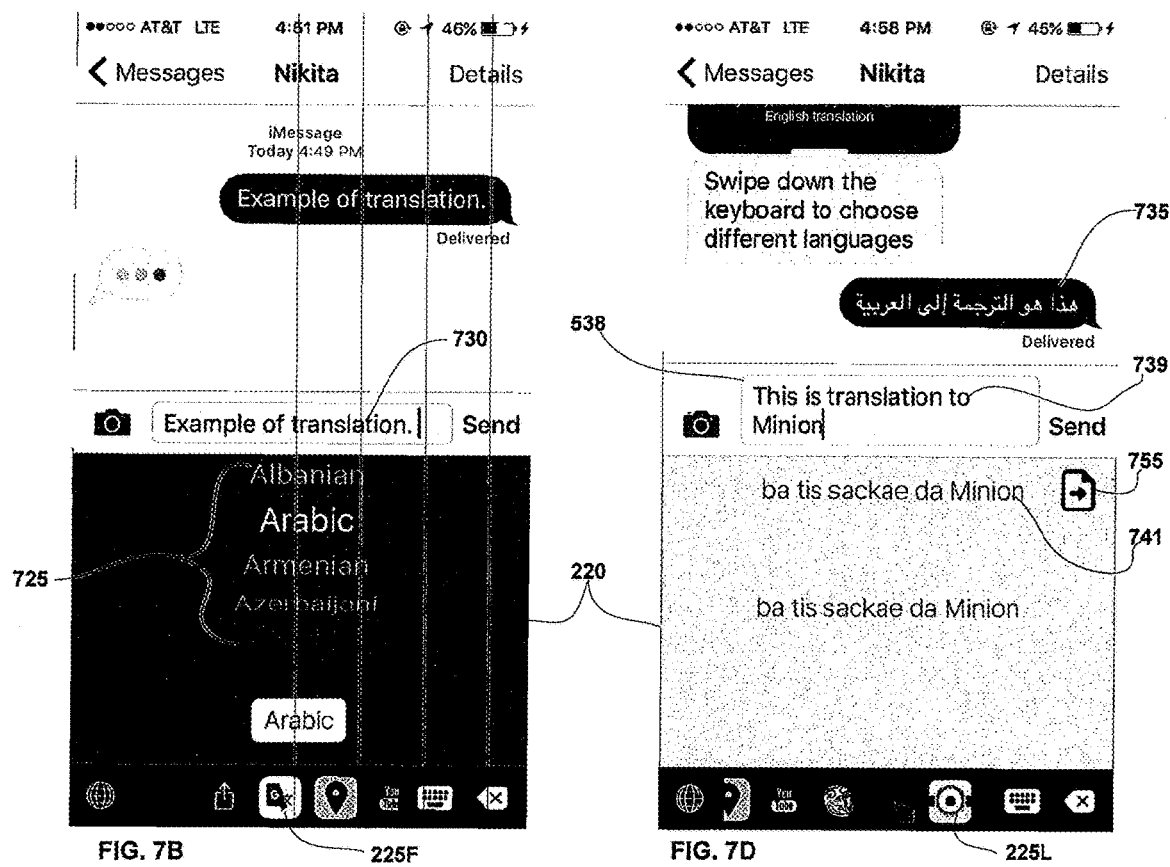

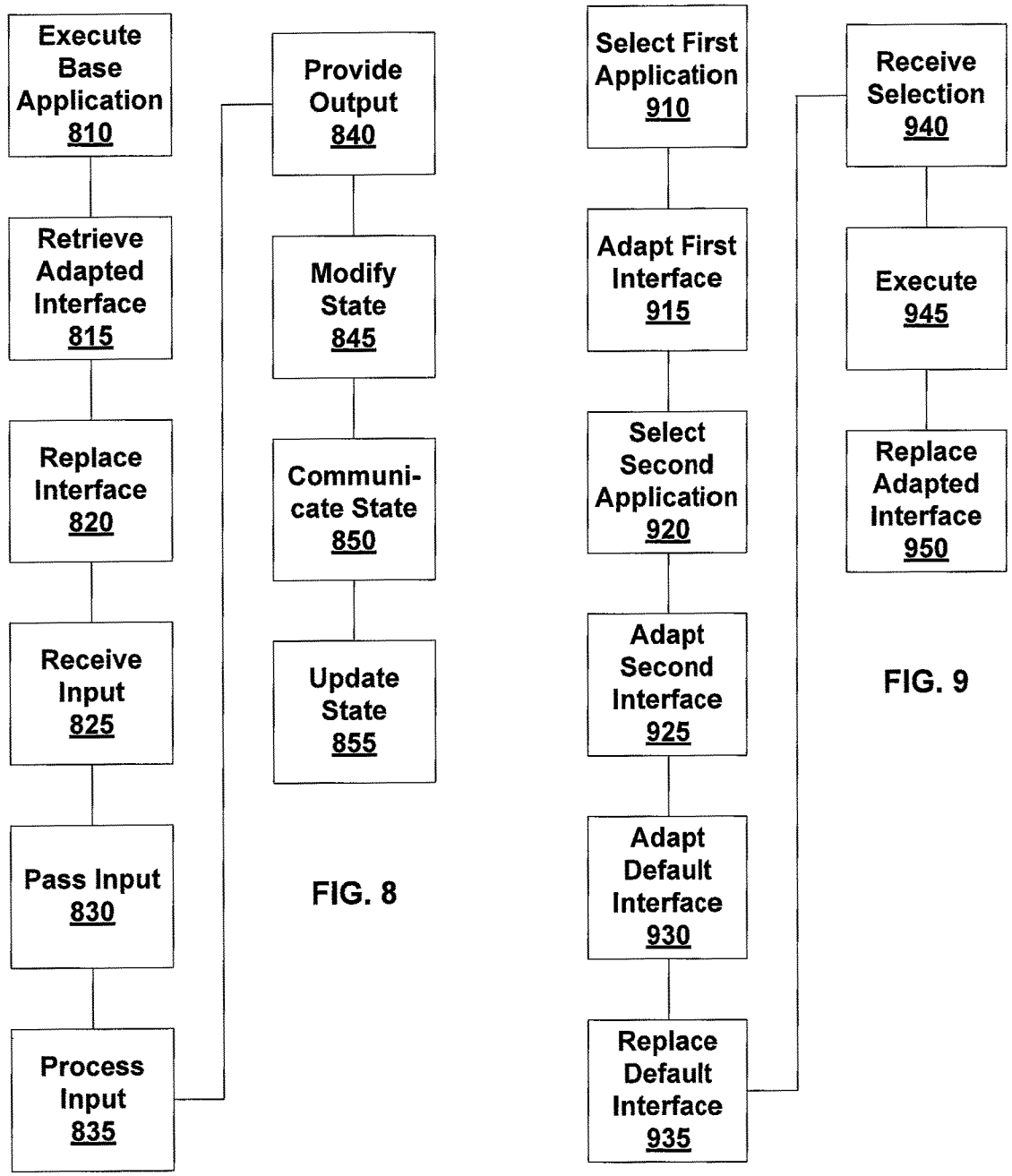

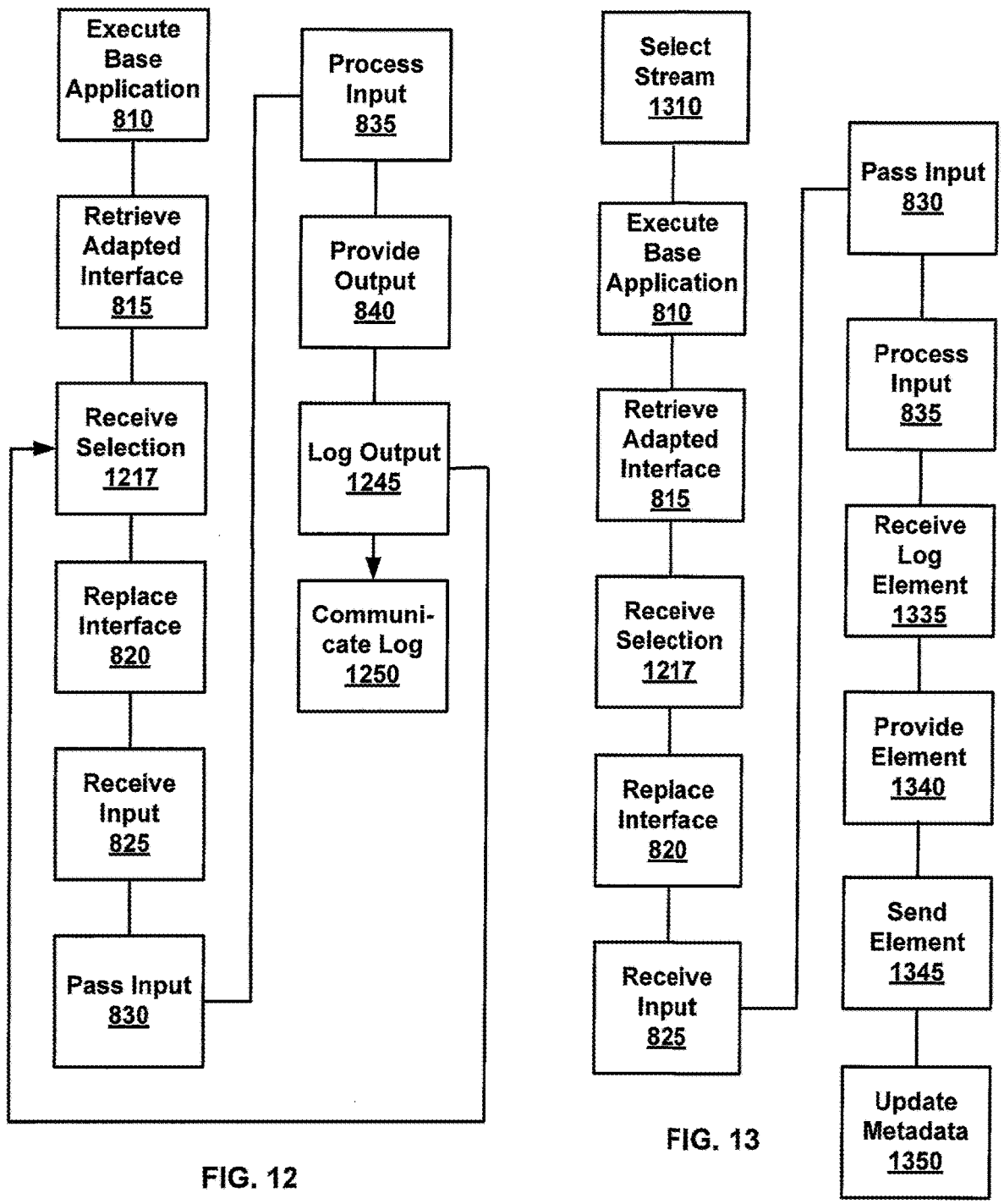

ENHANCED KEYBOARD INCLUDING MULTIPLE APPLICATION EXECUTION

CROSS-REFERENCE TO RELATED APPLICATIONS

This application is a 371 filing from PCT application PCT/US2017/017431 filed Feb. 10, 2017, PCT application PCT/US2017/017431 claims the benefit of U.S. Provisional patent application No. 62/293,893 filed Feb. 11, 2016 and titled "Adapted Application Interfaces," and claims the benefit of U.S. Provisional patent application No. 62/358,266 filed Jul. 5, 2016 and titled "Self-Propagating Application," and further claims the benefit of U.S. Provisional patent application No. 62/384,368 filed Sep. 7, 2016 and titled "Social Keyboard". The disclosures of all of the above applications are hereby incorporated herein by reference.

BACKGROUND

Field of the Invention

The invention is related to computer applications and more specifically to adapted interfaces for computer applications.

Related Art

Many applications, such as those found in mobile devices, include default user interfaces. These can include a virtual keyboard or other virtual input device. Typically, a user can select between different interfaces, such as a keyboard that includes Latin or Cyrillic characters. Such interfaces can include a dedicated function, such as a built-in search button configured to execute a search based on a text input.

SUMMARY

A user interface of a base application is replaced with a dynamic user interface that is configured to call functions of a separate dependent application. The base application can be any application that uses a virtual user interface, which can be replaced by alternative interfaces. For example, many mobile applications utilize a keyboard extension, supplied by an operating system, which is configured to display a virtual keyboard to a user. In some embodiments of the invention, the virtual keyboard interface is replaced by an adapted user interface configured for interaction with a different, dependent application. The replacement user interface is "nested" because the interface to a dependent application is placed and accessed within a different application. The replacement user interface is referred to herein as an "adapted" user interface because it usually, but not necessarily, requires some adaptation prior to being used within a base application. This adaption is often required because the dependent application was intended to be executed directly on an operating system—rather than from within a separate application—and has an interface configured for such execution. For example, prior to adaptation, the interface to an application may be configured to assume that all of a display is available for use.

The dependent application can be selected from a wide variety of alternative applications. The adapted user interface can be configured for sending a variety of different commands to the dependent application so as to take advantage of multiple capabilities of the dependent application. Examples, of dependent applications include browsers, games, social networking applications, image sharing applications, etc.

Various embodiments of the invention include a computing device comprising: a display; a base application configured to execute on the computing device and to present a first user interface on the display; a dependent application configured to execute on the computing device and to present a second user interface on the display; interface adaptation logic configured to adapt the second user interface for presentation within the first user interface; data transfer logic configured to transfer data from the second user interface to the first user interface; storage configured to store at least the dependent application; and a microprocessor configured to execute at least the interface adaptation logic.

Various embodiments of the invention include a method of executing an application, the method comprising: executing a base application on a first computing device, the base application including a user interface; retrieving an adapted user interface from a source external to the base application, the adapted user interface including at least one functional call to a dependent application; replacing the user interface within the base application with the adapted user interface; receiving an input from a user at the adapted user interface; passing the input to the dependent application; processing the input using the dependent application to produce an output of the dependent application; and providing the output to the user via the adapted user interface.

Various embodiments of the invention include a method of executing an application, the method comprising: selecting a first application from a plurality of third-party applications; adapting a user interface of the first application for execution of the first application from within a base application; selecting a second application from the plurality of third-party applications; adapting a user interface of the second application for execution of the second application from within the base application; adapting a default interface of the base application to include a shortcut icon to the first application and a shortcut icon to the second application; replacing the default interface of the base application with the adapted default interface including the shortcut ions to the first and second applications; receiving a selection of the shortcut icon to the first application at the adapted default interface; executing the first application; and replacing the adapted default interface with the adapted user interface of the first application within the base application.

Various embodiments of the invention include a computer executable code stored on a non-transient computer readable medium; the computer executable code comprising: keyboard logic configured to provide a virtual keyboard to a plurality of different communication applications on a first mobile device, the virtual keyboard including a first shortcut key configured to copy a first link into a text editing field of each of the communication applications, wherein the first link is configured to be received by a second mobile device and configured for delivery of the keyboard logic to the second mobile device.

Various embodiments of the invention include a computer executable code stored on a non-transient computer readable medium; the computer executable code comprising: application logic configured to execute a third party application on a first mobile device; and keyboard logic configured to provide a virtual keyboard to a plurality of different communication applications on the first mobile device, the virtual keyboard including a first shortcut key configured for placing a first link into a text editing field of each of the communication applications, wherein the first link is configured to be received by a second mobile device and configured for provisioning of the application logic to the second mobile device.

The executable code discussed herein is optionally provisioned on a server comprising: a memory configured to store a plurality of applications, at least one of the application including the computer executable code; access logic configured for users to browse and select members of the plurality of applications; an I/O configured to communicate with a plurality of remote clients over a communication network and to provide the selected members of the plurality of applications to the remote clients; and a processor configured to execute at least the access logic.

Various embodiments of the invention include an application server comprising: a memory configured to store a plurality of applications; access logic configured for users to browse and select members of the plurality of applications; an I/O configured to communicate with a plurality of remote clients over a communication network and to provide the selected members of the plurality of applications to the remote clients; and a processor configured to execute at least the access logic, wherein at least a first of the applications includes keyboard logic configured to provide a virtual keyboard to a plurality of different communication applications on a first mobile device, the virtual keyboard including a first shortcut key configured to provide a first link into a text editing field of each of the communication applications, wherein the first link is configured to be received by a second mobile device and for provisioning of the first of the applications to the second mobile device.

Various embodiments of the invention include an application server comprising: a memory configured to store a plurality of applications; access logic configured for users to browse and select members of the plurality of applications; an I/O configured to communicate with a plurality of remote clients over a communication network and to provide the selected members of the plurality of applications to the remote clients; a processor configured to execute at least the access logic, wherein at least a first of the applications includes keyboard logic configured to provide a virtual keyboard to a user of a first mobile device, the virtual keyboard including a first shortcut key configured to provide a first link to a text editing field of a communication application, wherein the first link is configured to be received by a second mobile device and configured for provisioning of the first of the applications on the second mobile device.

Various embodiments of the invention include a computer first mobile device comprising: a display; a memory configured to store a plurality of applications, at least one of the applications being a communication application configured for communicating to a second mobile device; an operating system configured for execution of the plurality of applications; keyboard logic configured to provide a virtual keyboard to the communication application, the virtual keyboard including a first shortcut key configured to copy a first link into a text editing field of the communication application, wherein the first link is configured for delivery of the keyboard logic to the second mobile device; and a microprocessor configured to execute at least the keyboard logic.

Various embodiments of the invention include a method of sharing software, the method comprising: receiving, on a first mobile device, a keyboard extension; installing the keyboard extension on the first mobile device, the keyboard extension including a first shortcut key; executing a communication application on the first mobile device, the communication application including an input field; selecting the first shortcut key to provide a link to the input field, the link being configured for installation of the keyboard extension; and sending the link to a second mobile device using the communication application.

Various embodiments of the invention include a computing device comprising: a display; a base application configured to execute on the computing device and to present a first user interface on the display, the first user interface including a first virtual keyboard, the first virtual keyboard including a plurality of shortcut keys to third party applications; a first dependent application configured to execute on the computing device and to present a second user interface on the display; a second dependent application configured to execute on the computing device and to present a third user interface on the display; interface adaptation logic configured to present the second user interface and the third user interface within the first user interface in response to the shortcut keys; data transfer logic configured to transfer data from the second user interface to the first user interface, and to transfer data from the third user interface to the first user interface; logging logic configured to generate a log of the transfers of data from the second and third user interfaces to the first user interface; storage configured to store at least the dependent application and the log; and a microprocessor configured to execute at least the interface adaptation logic and the logging logic.

Various embodiments of the invention include a method of logging communicated data, the method comprising: executing a base application; retrieving a first user interface for display in the base application, the first user interface including a plurality of shortcut key each associated with a different dependent application; receiving a selection of a first member of the plurality of shortcut keys; replacing the first user interface with a second user interface in response to the received selection, the second user interface being an interface to a first dependent application; receiving a first user input on the second user interface; passing the first user input to the first dependent application; processing the first user input using the first dependent application; providing an output of the first dependent application to an input field of the base application; and logging data representative of the output of the first dependent application to create a log of data, the log of data including data representing outputs of multiple dependent applications, each of the outputs of the multiple dependent applications having been provided to the input field of the base application.

Various embodiments of the invention include method of communicating using a stream of communicated data, the method comprising: selecting an input stream, the input stream including a first log of data including data representing outputs of multiple dependent applications, each of the outputs of the multiple dependent applications having be provided to the input field of a first base application on a first remote computing device; executing a second base application on a local computing device; retrieving a first user interface for display in the second base application, the first user interface including a plurality of shortcut key each associated with a different dependent application; receiving a selection of a member of the plurality of shortcut keys; replacing the first user interface with a second user interface in response to the received selection, the second user interface being an interface to a first dependent application, the first dependent application being configured for providing the outputs of the multiple dependent applications to a user via the second user interface; receiving a first user input on the second user interface; passing the first user input to the first dependent application; processing the first user input using the first dependent application; receiving one of the outputs of multiple dependent applications in response to the processing of the first user input, the received output becoming an output of the first independent application; providing the output of the first dependent application to in input field of the second base application, the output of the first dependent application including one of the outputs of the multiple dependent applications; providing the output of the first dependent application to a second remote computing device using the second base application.

Various embodiments of the invention include a method of mapping social connections between different social networks, the method comprising: receiving a first stream of data from a first remote computing device, the first stream of data including data representing outputs of multiple dependent applications, each of the outputs of the multiple dependent applications having been provided to the input field of a first base application on the first remote computing device and having been communicated from the first remote communicating device to a second remote communication device using the first base application, wherein the first base application is a messaging application associated with a first social network; storing a record of the communication of the outputs from the first remote communication device to the second remote communication device, in a storage; receiving a second stream of data from a third remote computing device, the second stream of data including data representing outputs of multiple dependent applications, each of the outputs of the multiple dependent applications having been provided to the input field of a second base application on the third remote computing device and having been communicated from the third remote communicating device to a fourth remote communication device using the second base application, wherein the second based application is a different messaging application associated with a second social network; storing a record of the communication of the outputs from the third remote communication device to the fourth remote communication device, in the storage; identifying the outputs, represented by the first and second streams of data, using metadata associated with each of the outputs and included in the first and second streams of data; identify a member of the outputs that is represented by data in both the first and second streams of data; storing a record of the member of the outputs that is represented by data in both the first and second streams of data, in the storage; and using the records stored in the storage to map communication of the member of the outputs between the first social network and the second social network.

Various embodiments of the invention include a computing device comprising: a display; a base application configured to execute on the computing device and to present a first user interface on the display, the first user interface including a first virtual keyboard, the first virtual keyboard including a shortcut key to a third party application and at least one advertising key; a dependent application configured to execute on the computing device and to present a second user interface on the display in response to the shortcut key; interface adaptation logic configured to present an adapted user interface on the display within the first user interface, the adapted user interface including an adaptation of the second user interface; advertising logic configured to place the advertising key in the first virtual keyboard and optionally to select functionality of the advertising key based on a user profile; data transfer logic configured to transfer data from the second user interface to the first user interface; storage configured to store at least the dependent application; and a microprocessor configured to execute at least the advertising logic and interface adaptation logic.

Various embodiments of the invention include a computing device comprising: a display; a base application configured to execute on the computing device and to present a first user interface on the display, the first user interface including a first virtual keyboard, the first virtual keyboard including a plurality of shortcut keys to third party applications; a first dependent application configured to execute on the computing device and to present a second user interface on the display; a second dependent application configured to execute on the computing device and to present a third user interface on the display; interface adaptation logic configured to present the second user interface and the third user interface within the first user interface in response to the shortcut keys; data transfer logic configured to transfer data from the second user interface to the first user interface; storage configured to store at least the dependent application; and a microprocessor configured to execute at least the interface adaptation logic.

Various embodiments of the invention include a method of using a keyboard extension, the method comprising: receiving the keyboard extension, the keyboard extension being configured to replace a default virtual keyboard in a messaging application and including a first shortcut key for accessing a first application from within an interface to the messaging application, the "accessing" optionally includes executing or downloading the first application; placing the keyboard extension and the first application in a digital package configured for downloading to remote clients; providing the package to a first remote client; receiving tracking data characterizing usage of the shortcut key on the first remote client; and engaging in a financial transaction in responsive to the usage.

BRIEF DESCRIPTION OF THE DRAWINGS

FIG. 2 illustrates a messaging application including a virtual keyboard, according to various embodiments of the invention.

FIG. 3 illustrates a messaging application including an adapted user interface including plurality of shortcut icons, according to various embodiments of the invention.

FIGS. 5A and 5B illustrate transfer of a graphic made using the graphics application of FIG. 4 from a dependent application to a base application, according to various embodiments of the invention.

FIGS. 7B, 7C and 7D illustrate examples of translating text using a keyboard extension, according to various embodiments of the invention.

FIG. 8 illustrates a method of executing an application, according to various embodiments of the invention.

FIG. 9 illustrates a method of executing an application from a virtual menu, according to various embodiments of the invention.

FIG. 12 illustrates methods of creating a log, according to various embodiments of the invention.

FIG. 13 illustrates methods of receiving logs, according to various embodiments of the invention.

DETAILED DESCRIPTION

Figure 1:
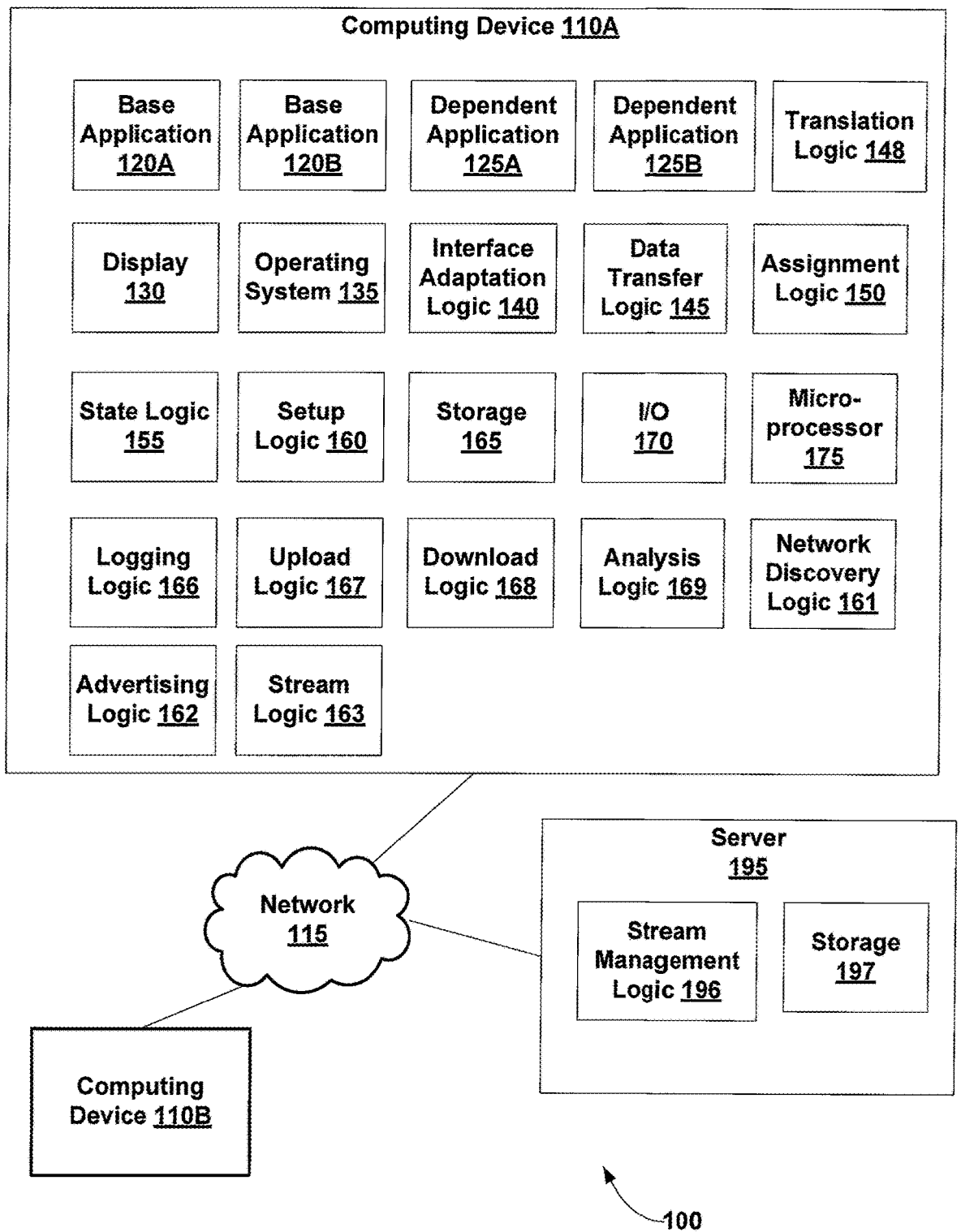
FIG. 1 illustrates a computing system, according to various embodiments of the invention.

FIG. 1 illustrates a Computing System 100, according to various embodiments of the invention. The illustrated Computing System 100 includes a plurality of Computing Devices 110 (individually identified 110A, 110B, etc.), a Network 115, and an optional Server 195.

Computing Devices 110 include a computing device or system configured to execute computing instructions. Computing Devices 110 can be a mobile device, a tablet computer, a laptop computer, a desktop computer, a personal computer, a laptop computer, a tablet computer, a mobile communication device (e.g., smartphone), a wearable device, a headset, and/or the like. Network 115 is a communication network, such as the Internet or a cellular network, over which data packets are communicated using destination addresses such as a phone identifier, MAC or IP addresses. Network 115 optionally communicates using a standard such as TCP/IP. Systems discussed herein may include a device within a single housing or alternatively a plurality of connected parts in different enclosures that make up the system. For example, the components of Computing Device 110A may all be including in a cellular telephone or tablet computer having a single housing (e.g., case).

Computing Devices 110 include a Display 130 configured to present a graphical interface to a user. In various embodiments, Display 130 is a display screen of a personal computer, a laptop computer, a tablet computer, a mobile communication device (e.g., smartphone), a wearable device, a headset, and/or the like. Display 130 is optionally a touch sensitive display.

Computing Devices 110 include one or more Base Applications 120 (individually designated 120A, 120B, etc.). Base Applications 120 are applications installed on Computing Devices 110 and include hardware, firmware and/or software stored on a non-transient computer readable medium. Base Applications 120 can include, for example, text messaging applications, e-mail applications, drawing applications, e-commerce applications, social network applications, map applications, search applications, browser applications, and/or the like. Typically, Base Applications 120 make use of a virtual keyboard or similar virtual interface that is configured for a user to provide keystrokes or to select objects. The virtual interface may be provided by an operating system of Computing Devices 110. For example, a virtual keyboard may be provided as an application extension by the iOS operating system offered by Apple, Inc. The virtual interface may be shared by multiple applications installed on each of Computing Devices 110. In some embodiments, the virtual interface is selectable from within Base Applications 120. For example, a user may select between keyboards having Roman or Cyrillic fonts. The virtual interfaces of Base Applications 120 may include non-keyboard interfaces. Typically, a predetermined amount of screen real estate (pixel area) is assigned to the virtual interface. In some embodiments, Base Applications 120 include iOS messenger, Facebook messenger, WhatsApp, SnapChat, WeChat, and/or the like. These messenger applications are associated with separate social networks. For example, Facebook messenger is used with the Facebook social network, and iOS messenger is associated a network of a user's contents.

Computing Devices 110 include one or more Dependent Applications 125 (individually designated 125A, 125B, etc.). Dependent Applications 125 are applications installed on Computing Devices 110 and include hardware, firmware and/or software stored on a non-transient computer readable medium. As with Base Applications 120, Dependent Applications 125 can include, for example, text messaging applications, drawing applications, e-commerce applications, e-mail applications, social network applications, map applications, search applications, browser applications, an HTML shell, and/or the like. An HTML shell is an application configured to execute HTML instructions, as may be accomplished by a browser. An HTML shell is optionally configured to accept and use extensions such as Java or Adobe Flash.

A particular application can be a Base Application 120 at some times and a Dependent Application 125 at other times. The distinction between Base Applications 120 and Dependent Applications 125 is that the functionality of Dependent Applications 125 may be called within a nested user interface of Base Applications 120. An application is a Dependent Application 125 when it is accessed through an interface within one of Base Applications 120. The Dependent Application 125 discussed herein are typically accessed via an adapted user interface that is not a default interface of the Base Application 120 but has specifically been adapted for accessing the Dependent Application 125 from within a Base Application 120. The adapted user interface is typically not a default interface of either Dependent Application 125 or Base Application 120, but is an adaptation of a default interface to the Dependent Application 125. Further examples of Base Applications 120 and/or Dependent Applications 125 include a Facebook® application, a Youtube® application, a search application, a map application, an e-mail application, Instagram®, a music application, a picture sharing application, a video sharing application, a social media application, and/or the like. As the terms are used herein, an operating system is not considered an example of Base Application 120.

The output of Dependent Applications 125 can include a user interface, graphics, images, links, URLs, videos, audio, text, commands, data, metadata, HTML, scripts, computing instructions, and/or the like. For example, Dependent Application 125A may be configured to provide a user interface configured for a user to edit a photo. Dependent Application 125A may be configured to provide a user interface configured for the user to play a game, the game optionally being a multiplayer game played by users at different Computing Devices 110. Dependent Application 125A may be configured to provide a user interface to an e-commerce website or application in which a user can select and purchase products or services. Dependent Application 125A may be configured to provide a user interface to a browser.

Both Base Applications 120 and Dependent Applications 125 are optionally third party applications installed on Computing Device 110A from a library of applications. For example, these applications may be installed from the Apple App Store or from Google Play. As a third party application, they are normally configured to receive updates from the third party source. As discussed further herein, in some embodiments, a user can select which applications should be accessible from within a user interface active within Base Applications 120. More than one Dependent Application 125 is optionally accessible from within a single user interface. For example, a user interface can include a keyboard and a plurality of shortcut-keys ("shortcuts" or "hotkeys"), each of which is represented by an icon and is configured to evoke a different member of Dependent Applications 125. Execution of a shortcut-key optionally results in the current user interface being replaced with a different (nested) user interface configured for accessing the associated member of Dependent Applications 125.

Computing Devices 110 further include one or more Operating System 135. Examples of Operating System 125 include iOS, Android and Windows. Base Application 120A and Dependent Application 125A are typically configured to both execute on Operating System 125. Computing Devices 110A and 110B optionally include different Operating Systems 135. In some embodiments, the interface to Base Application 120A, which is replaced by an adapted interface to Dependent Application 125A, is provided by Operating System 125. For example, the iOS operating system provides a variety of alternative virtual keyboards that can be called by applications executing on this operating system.

Computing Devices 110 further include Interface Adaptation Logic 140. Interface Adaptation Logic 140 is configured to adapt an interface of one or more Dependent Applications 125 for display within one or more Base Applications 120. The adapted interface is typically displayed within the Base Applications 120 as a substitute for a default user interface. For example, a keyboard interface that is otherwise displayed within Base Application 120A may be replaced with an adaption of a user interface of Dependent Application 125A.

The adaptation performed by Interface Adaptation Logic 140 can include a variety of changes and functionality. For example, Interface Adaptation Logic 140 may adapt the size of a user interface of Dependent Application 125A so as to fit within a particular screen area of Display 130. Interface Adaptation Logic 140 may also provide an API (Application Program Interface) configured to communicate commands and updates between Dependent Application 125A and the adapted interface. Adaptation of a user interface is optionally responsive to a keyword. For example, entering "car" in a field of an adapted user interface or a default application may result in an adapted user interface that includes an advertisement related to cars, or includes other car related content.

Adaptation of an interface size can include changing the number of pixels within Display 130 taken by the adapted user interface. For example, if the adapted user interface is replacing all or part of an existing user interface, the adapted user interface may initially be adapted to occupy a subset of pixels that were occupied by the replaced user interface. The height/width ratio of the adapted user interface may additionally be adapted to fit the available screen space.

Adaptation of a user interface can include addition of advertisements to the user interface. These advertisements optionally include links configured for purchasing products or services. Such advertisements are optionally communicated between Computing Devices 110 and/or communicated to a Base Application 120, as part of the various communications described elsewhere herein.

Interface Adaption Logic 140 is optionally configured to adapt the size and orientation of an adapted user interface of Dependent Application 125A in response to a variety of criteria. These criteria include, for example: a) the size of an interface that the adapted interface is replacing in Base Application 120, b) an orientation and/or movement of Computing Device 110A (e.g., rotation from portrait to landscape mode), c) the identity of Base Application 120A, d) a user command entered on the adapted user interface, e) a command received via Network 115 (e.g., from Computing Device 110B and/or a Server 195), f) a state of Dependent Application 125A, and/or the like. In a specific example, the size of an adapted user interface can be change in response to a game state. Parts of a game requiring a more detailed interface (e.g., more buttons) may be shown in a larger area of Display 130 relative to parts of a game requiring a less detailed interface.

In specific examples, an adapted interface may be sized to occupy the display area previously occupied by a virtual keyboard part of an interface. When Computing Device 110A is rotated from a portrait orientation to a landscape orientation the fraction of Display 130 occupied by the adapted display can be increased. For example, an adapted user interface that occupied less than 50% of Display 130 in the portrait orientation may occupy between 90 and 100% of display in the landscape orientation.

A user interface to Dependent Application 125A that is adapted by Interface Adaptation Logic 140 may be responsive to an identity of Base Application 120. For example, a user interface inserted into a text messaging application may be presented as a larger size than when the same dynamic user interface is inserted into a picture sharing application.

In some embodiments, a user interface to Dependent Application 125A is presented at the same size as a specific part of the default interface to Base Application 120A that it replaces. The size and content of the user interface may then be changed in response to the various factors discussed herein. Changes to the user interface may be in response to a state of Base Application 120A and/or Dependent Application 125A. A user interface to Dependent Application 125A is optionally changed in response to commands received by Computing Device 110A via Network 115. These commands may be received from Computing Device 110B, from Server 195, and/or from some other source. In an illustrative example, Dependent Application 125A is a multi-player game application that allows a first player at Computing Device 110A to play against a second player at Computing Device 110B. The state of the game can be maintained on Computing Devices 110A and 110B, and/or at Server 195. Commands and game state data can be communicated to Computing Device 110A and there used to change the content and/or size of the user interface displayed within Base Application 120A. Likewise, inputs provided at the user interface can be communicated via Network 115 to other Computing Devices 110 and/or Server 195. The Base Applications 120 used to host the adapted user interface to Dependent Application 125A on different Computing Devices 110 can be different. For example, to players can be playing a game together, one of the players using an interface hosted by an e-mail application and the other of the players using an interface hosted by a text messaging application. Likewise, if a user starts a game on Computing Device 110A with a user the interface hosted by Base Application 125A, the user may close Base Application 125A and continue the game using a user interface hosted by Base Application 125B. The adapted interface can optionally be accessed through any of Base Applications 125. The communication of commands and data between Dependent Application 120A and an adapted user interface displayed within Base Application 125A typically occurs through an Application Program Interface (API).

Computing Devices 110 optionally further include Data Transfer Logic 145. Data Transfer Logic 145 is configured to transfer data and commands between Base Applications 125 and Dependent Applications 120. For example, if Base Application 125A includes a virtual keyboard and configured to receive keystrokes from this virtual keyboard, then Base Application 125A can receive "keystrokes" from an adapted user interface (to Dependent Application 120A) that replaces the virtual keyboard. Data Transfer Logic 145 can be configured to accept user input at the adapted user interface and to provide input to Base Application 125A in response to this user input.

Data Transfer Logic 145 may modify the user input prior to providing it to Base Application 125A. For example, Data Transfer Logic 145 may translate between languages, may encrypt data, may replace a character with a graphic, replace a character with an image, and/or the like. Data Transfer Logic 145 is optionally configured to call functions within Dependent Application 120A in response to a user input and then to provide an output of these functions to the adapted user interface and/or Base Application 125A. For example, a user may enter a character on the adapted user interface, this character is communicated by Data Transfer Logic 145 to Dependent Application 120A wherein it is used to select an image. Data Transfer Logic 145 then provides keystrokes (e.g., characters or screen touch points) to Base Application 125A to prepare Base Application 125A to receive the image. These keystrokes may mimic actions that would normally prepare Base Application 125A to receive an image (e.g., selection of a camera icon and a "use existing photo" option). The image can then be provided to Base Application 125A. If Base Application 125A is a text messaging or e-mail application the image can automatically appear in the appropriate input field. Thus, Data Transfer Logic 145 can be configured to automatically transfer data between Base Applications 125 and Dependent Applications 120.

Data Transfer Logic 145 is optionally configured to correlate the positions on a touch sensitive embodiment of Display 130 with specific functions, as a user interface is adapted to various sizes. For example, Data Transfer Logic 145 can be configured to correlate a touch position with an icon displayed on the interface and, based on this correlation, call functions of Dependent Application 125A that are associated with the icon.

In some embodiments, Data Transfer Logic 145 is configured to transfer contents to a cut/paste buffer of Operating System 135. These contents can then be copied to input fields of Base Applications 120 using a "paste" operation under user control. For example, in response to selection of a shortcut-key, keystrokes, a link, an image, or any other content can be copied to a cut/paste buffer. The content may come from one of Dependent Applications 125 and/or from a Storage 165 (discussed further below). Alternatively, Data Transfer Logic 145 may be configured to directly copy such contents into the input fields of Base Applications 120 (without requiring a user to perform a paste action). For example, a shortcut-key on a virtual keyboard displayed in Base Application 120A may be configured to (when selected) automatically copy a link (or any other content) from Storage 165 to an input field of Base Application 120A. Further, Data Transfer Logic 145 may be configured to retrieve data from a source external to Computing Device 110A and transfer all, part and/or a derivative to the retrieved data to the input field of Base Application 120A.

Computing Device 110A optionally further includes Logging Logic 166. Logging Logic 166 is configured to generate a log of the transfers of data from the user interfaces of Dependent Applications 120 to an input field of Base Application 120A or 120B. For example, Logging Logic 116 may be configured to generate a record in a log that an output of Dependent Application 120A was inserted into an input field of Base Application 120A, the input field being part of a user interface to Base Application 120A. The logging performed by Logging Logic 166 can be automatic and the resulting record can include data representative of the output of Dependent Application 120A or 120B. As used herein, the term "log" is meant to mean a set of records of events, the set optionally including an ordered sequence of events. As a verb, "log" or "logging" refers to the addition of a record of an event to a log. A log can be stored in a file or a data structure.

Logs are optionally shared and/or subscribed to. For example, a user of Computing Device 110B may subscribe to a log generated at Computing Device 110A and a log generated at Computing Device 110B may be shared to multiple destinations including Server 195 and/or other Computing Devices 110. A subscriber to a log may execute an instance of Dependent Application 120A configured for accessing logs and use that Dependent Application 120A to share data within the logs to others using an input field of Base Applications 120A or 120B. In a specific example, a user of Computing Device 110B may copy a gif from Dependent Application 120A to Base Application 120A, and subsequently copy a link to a song on Spotify from Dependent Application 120B to Base Application 120B. Both of these events are added to a log generated on Computing Device 110B. The generated log may then be communicated to Computing Device 110A, optionally via Server 195. At Computing Device 110A the log is received as part of an input stream that may include logs generated at multiple sources. A user of Computing Device 110A may access the input stream using another member of Dependent Applications 125 and select objects within the input stream to place in an input field of any of Base Application 120. For example, the user may share the gif using Facebook messenger and the link to the Spotify song using WhatsApp. Each of these sharing events are optionally recorded as part of a log on Computing Device 110A. As such, data and object represented by this data can be shared among multiple Computing Devices 110 in a linear and/or serial fashion. The logs discussed herein are distinguished from a mere list of frequently used links or gifs by, for example, the fact that they may include use between multiple Dependent Applications 125 and multiple Base Applications 120, further the logs my include a combination of links, images, gifs, text, audio, and or the like.

The log generated by Logging Logic 116 can include a copy of the actual data inserted into the input field, a link to that data, and/or some other representation the outputs of one or more of Dependent Applications 120. The log optionally further includes metadata characterizing the outputs. For example, a record within a log can include metadata characterizing an original owner or source of the output. This may include a website from which the output was first obtained, an editor or creator of the object included in the output. Specifically, the record can include an identity of the creator of an animated gif or of a recording.

A record within a log can include a unique identifier of the output. As is described elsewhere herein, this identifier can be used to map sharing of an object between Computing Devices 110. Unlike systems of the prior art, this tracking is independent of a social network associated with a specific messaging application. Sharing of an object can be tracked/mapped as it is communicated using and between e-mail, Facebook Messenger Instagram and WhatsApp. This tracking maps out a user's entire set of social networks, creating an inter-network map associated with the "super-network" of a specific user. Each of the users and/or their Computing Devices 110 may be identified by a unique identifier of this super-network that include multiple, previously separate, social networks. In alternative embodiments, instead of a unique identifier for an object, mapping of sharing of an object may be based on a sharing history and/or the actual object data. For example, a first image shared to Computing Device 110A may be compared to a second image later shared from Computing Device 110A to Computing Device 110B. If this comparison shows the first and second images are the same, it can be concluded that the same object was shared. This conclusion may be made independent of the members of Base Application 120 and/or Dependent Application 125A used to share the image Shared data is optionally assigned a unique identifier when first shared or added to a log of shared data. In some embodiments the unique identifier of the data is based on a unique identifier of user and a timestamp.

A record within a log can include a link to a cache of the output. For example, the data within a log can include a link to a location on Server 195 on which an image, an application, and/or any other web content is stored. A link to an application can be configured to download the application or to execute the application remotely. Coupled with a unique identifier, this information is optionally used to map sharing of an application between users.

A record within a log can include a tags characterizing data shared using the systems and methods described herein. For example, an image may be associated with metadata characterizing contents of the image, an application may be associated with data on which the application executes, an image, animated gif, song or a video may be associated with metadata classifying the image, gif, song or video. The classification and other tags are optionally used to search for the data within one or more logs. In some embodiments users can add tags to data prior to sharing the data.

A record within a log can include a number of times that data has been shared. This count may include the number of times data has been place in an input fields of Base Applications 120 or the number of times data has actually been communicated from members of Computing Devices 110 to other members of Computing Devices 110 or other devices capable of executing Base Applications 120A. For example, a record can include a record of how many times an image or a link to a video has been placed in an input field of a Base Application 120A from Dependent Application 125A. Such accounting can be specific to a particular member of Base Applications 120, specific to a particular member of Dependent Applications 125, specific to a particular class of Base Applications 120 and/or Dependent Applications 125, and/or general to all sharing events. In some embodiments the accounting of sharing events is performed at Server 195 and each sharing event results in sending an increment counter command to Server 195. The increment counter command may include the unique identifier of the data as well as an identity of the user/Computing Device 110, identity of a member of Base Applications 120, and/or identity of a member of Dependent Applications 125, involved in the sharing event.

A record within a log can include a count of "likes", comments made on an object (or link there to), identities of users who made comments and/or likes, etc. In some embodiments, the meta data includes a history of users/Computing Devices 110A that shared the data.

In some embodiments, a user of Computing Device 110A can modify or select metadata included in a log of shared data. For example, a user may add tags characterizing content or classification of shared data. A user may restart a counter of how often data has been shared or hide the original source/owner of shared data.

When the metadata associated with a sharing event includes a link to an owner or source of the shared data, the link is optionally used to follow other data generated from that source. For example, if the shared data includes an image that originated from an Instagram account, the data may include a "follow" link configured to allow a user to follow further images posted on that account using the functionality of Instagram's image sharing network. In some embodiments, members of Base Applications 120 are optionally set to open links automatically.

The log created using Logging Logic 166 may be stored in Storage 165 and/or may be uploaded to a Storage 197 of Server 195. The log and any of the metadata therein is optionally used by Advertising Logic 162 to select advertisements for display to a user. For example, tags characterizing contents of a video may be used to select related advertisements. These tags are optionally added to the metadata by users that shared the data. Data related to a count of time data is shared is optionally used to generate input streams of data that is popular to share. The popularity of sharing may be dependent on the members of Base Applications 120 and/or Dependent Applications 125 involved in any specific sharing event. For example, some data may be more popular to share within a WhatsApp account and different data may be relatively more popular to share within Facebook messenger.

Logs of shared data are typically associated with a particular user and/or member of Computing Devices 110. These logs are part of a user profile that can include a user identifier, a history of sharing data, a history of being an original source of shared data, a history of editing/modifying shared data, a history of application usage, user characteristics provided by the user (e.g., gender and age), user characteristics generated by Analysis Logic 169 (discussed elsewhere herein), a list of "followers" who follow the sharing logs generated by the user, a stream following list of external logs followed by the user, and/or the like.

Computing Device 110A optionally further includes Translation Logic 148. Translation Logic 148 is configured to translate text between languages, to translate commands between command spaces, and/or to translate data between different syntaxes. All or part of Translation Logic 148 is optionally located external to Computing Device 110A. Further details of Translation Logic 148 are discussed elsewhere herein.

Computing Devices 110 optionally further include Assignment Logic 150. Assignment Logic 150 is configured to assign Computing Devices 110 (or a user thereof) to specific communication sessions with remote devices over Network 115. These communication sessions are optionally secure, e.g., they use a secure socket layer (SSL). The communication sessions may be between different Computing Devices 110 (peer-to-peer) or between Computing Device 110A and Server 195 (client-server). The assignment to a particular communication session can include assignment to specific communication sockets. Assignment to a specific communication session allows, for example, a user of Computing Device 110 to participate in a multi-player game with users of remote devices. Because the assignment is associated with one of Dependent Applications 120, the assignment can be maintained even as the interface to the one of Dependent Applications 120 is opened in different Base Applications 125.

The assignment of game players to a multi-player game session is optionally dependent on the users involved in a communication session, or vice versa. For example, the identities of users in a messaging session may be used to establish who is invited to a game session. In one example, the output of Dependent Application 120A including a game application may include an invitation to participate in the game and this output can be provided to one or more additional participants in a messaging session executed under Base Application 125A. Likewise, an instance of Base Application 125A that includes a game application may receive an adapted user interface to an instance of dependent Application 120A that includes a messaging or social networking application. Requests to participate/join in the game application can then be sent via the messaging or social networking applications.

In some embodiments, an invitation to participate in a game includes a link inserted into an input field of Base Application 120A and communicated to Computing Device 110B using Base Application 120A. The link may be to a game session on Server 195 (discussed below) or to a new communication channel between Computing Devices 110A and 110B over which a game state is shared. For example, the link may include identifying information regarding a particular address, a server configured to receive inputs from multiple sources and to maintain shared state that these inputs. Some or all of this shared state may be returned to the input sources. The link may include an address of Computing Device 110A. The link may include game state information, e.g., an input to the game state such as a move.

Computing Devices 110 optionally further include State Logic 155 configured to maintain a current state of one or more Dependent Applications 125 and/or Base Applications 120. This state can be used to pause execution of an application, to facilitate transfer of an interface between Base Applications 120, to synchronize application states between different Computing Devices 110, and/or the like. It can be desirable to pause execution of Dependent Applications 125 and/or Base Applications 120 while the other is in use. For example, if the adapted interface to Dependent Application 125A is currently occupying most of Display 130, then it can be desirable to pause Base Application 120A until the adapted interface is resized so that more of Base Application 120A is visible. Pausing and resuming of Base Application 120A can be responsive to the fraction of Display 130 that is occupied by the adapted interface to Dependent Application 125A.

An interface to Dependent Application 125A can be transferred from Base Application 120A to Base Application 120B simply be closing Base Application 120A (where the adapted interface is currently hosted), executing Base Application 120B and hosting the interface to Dependent Application 125A within Base Application 120B. State Logic 155 is optionally configured to pause the execution of Dependent Application 125A between the time Base Application 120A is closed and the adapted interface is hosted in Base Application 120B. State Logic 155 stores the state of Dependent Application 125A during this time.

State Logic 155 is used to synchronize application states between different Computing Devices 110 in a variety of embodiments. For example, if Dependent Application 125A is a multiplayer game or a collaborative editing application, a current state of the application may be needed at several Computing Devices 110 and/or Server 195. State Logic 155 is optionally configured to communicate the current state between these systems via Network 115. In one example, Dependent Application 125A is a computer game configured to be played by two or more players at different Computing Devices 110. The state of the computer game is responsive to moves or actions taken by each player at their respective member of Computing Devices 110, and is communicated between devices by State Logic 155.

In some embodiments, Base Application 120A is used to communicate between instances of Dependent Application 125A on different Computing Devices 110. This is possible where Base Application 120A is a communication application such as a text messaging application. As discussed elsewhere herein, the adapted interface to Dependent Application 125A may be configured to provide data to Bases Application 120A as would be provided by a virtual keyboard or other interface. This feature can be used to insert data in a messaging application that is then conveyed via the messaging application to a different member of Computing Devices 110. At the different member of Computing Devices 110, the inserted data is parsed and used to update a state of a corresponding Dependent Application 125A. In a specific example, a computer game can be played between two mobile devices (e.g., smart phones or tablet computers) and a text messaging application can be used to share game states between these devices. The data provided to the text messaging application can include plain text, encoded text, graphics, images, identifying information, input to other applications, links, and/or the like. For example, the data provided may include contact information or a link to contact information. Data can be encoded within the graphics or images. The use of a text messaging system, or other messaging system, to communicate between Dependent Applications 125 on different Computing Devices 110 can be applied to applications other than game applications. Examples of such other applications include cooperative editing applications, e-commerce applications, Internet of things (IoT) devices (e.g., sensors, cameras, internet appliances, etc.), and/or the like.

Computing Devices 110 optionally further include Setup Logic 160. Setup Logic 160 is configured to select applications that may become Dependent Application 120A or 120B within a particular member of Computing Devices 110. The applications are typically selected from a plurality of third party applications and multiple applications may be selected. In some embodiments the third party applications are received and updated from an application repository, such as the Apple App Store.

Setup Logic 160 is optionally configured to assure compatibility of an application for use as one of Dependent Applications 120. Compatibility may require that an interface to the application can properly be adapted for presentation within Base Applications 120. For example, Setup Logic 160 may determine if an interface to the application can be adapted to replace a virtual keyboard with Base Applications 120. In some embodiments, Setup Logic 160 is configured to try one or more adaptation templates in an attempt to find an adaptation template that results in a compatible adapted user interface. An adaptation template includes rules for the reduction of an interface size, reduction and rearrangement of icons, mapping of touch sensitive positions, addition of navigation tools to navigate a partially viewable interface, and/or the like.

In some embodiments, Setup Logic 160 is configured to add a shortcut icon to a virtual interface, the shortcut icon being a short cut to a selected application. For example, Setup Logic 160 may be configured to add a plurality of shortcut icons (e.g., a menu of shortcuts) to a virtual keyboard interface. This virtual keyboard interface (including the shortcut icons) can then be used as an adapted interface to replace a default keyboard interface that may be provided by Operating System 135. Each shortcut icon is configured to execute a different Dependent Application 120A and/or cause Data Transfer Logic 145 to transfer data to the Base Application 120A. Optionally, when a shortcut icon is selected the current adapted user interface is replaced by an adapted user interface to the member of Dependent Applications 125 associated with the shortcut icon. Thus, an adapted user interface is used to provide access to a plurality of applications, each of which would replace the adapted user interface with a second adapted user interface for that respective application.

Computing Devices 110 optionally further include Storage 165 configured to store data, metadata and computing instructions. For example, Storage 165 may be configured to store adapted interfaces, images, text, interface templates, links, metadata, and/or executable code. In some embodiments Storage, 165 is configured to store the instructions of Bass Applications 125 and/or Dependent Applications 120. In some embodiments, Storage 165 is configured to store scrips, links, and/or computing instructions configured to retrieve content from a source external to Computing Device 110A, e.g., Server 195. Storage 165 can include a hard drive, random access memory (dynamic or static), non-volatile memory, magnetic media, flash memory, optical memory, and/or other digital storage.

Computing Devices 110 further include an I/O 170. I/O 170 includes communication logic configured to communicate with external devices, for example, via Network 115. I/O 170 can include a wireless transmitter, an Ethernet connection, a modem, a router, and/or the like. I/O 170 can further include logic configured to place data in data packets, add internet protocol addresses to data packets and/or to encrypt data packets using standard internet protocols. I/O 170 typically includes data buffers configured to facilitate the sending and receiving of data over Network 115.

Computing Devices 110 further include a Microprocessor 175. Microprocessor 175 includes a microprocessor, an ASIC, a programmable logic array, a communication circuit, a central processing unit, and/or the like. Processor 110 is typically configured to perform specific tasks by the addition of software and/or firmware. For example, Processor 110 may be configured to execute Base Applications 125, Dependent Applications 120, and/or any of the other logic discussed herein.

Server 195 may be a file server, a web server, an application server, and/or the like. Server 195 can include one or more computing devices in communication with Computing Devices 110 via Network 115. In various embodiments, Server 195 can include State Logic 155, Assignment Logic 150, Setup Logic 160, Storage 165, I/O 170, and/or Microprocessor 175. Server 195 optionally includes computing instructions that are part of Base Application 120A or Dependent Application 125. For example, Dependent Application 125A may include text-to-voice or voice-to-text functionality wherein the actual conversion between voice and text is performed at Server 195.

In some embodiments one or more of Dependent Applications 125 include an application whose primary purpose is to provide the functionality of a virtual keyboard. For example, a purpose of the Hyperkey Chat 2.0™ application available at the Apple App Store is to provide a virtual keyboard using a combination of Interface Adaption Logic 140, Data Transfer Logic 145, Assignment Logic 150, State Logic 155, and/or Setup Logic 160. Alternatively, these logic elements (e.g., the downloadable software) may be provided as a bundle along with a third party application. For example, it is possible that these logic elements are stored on a server in conjunction with one or more applications such as Instagram™, Facebook™, SnapChat™, etc. The logic elements illustrated in FIG. 1 may be downloadable as an add-on to these various third party applications.

In some embodiments, a shortcut-key included in a virtual keyboard is configured to copy a link into an input field of Base Applications 120. This link is optionally configured for download an application to a user that receives the link via Base Applications 120. For example, using a shortcut-key, the link may be placed in an input field of Base Application 120A at Computing Device 110A and from this input field the link is communicated to Computing Device 110B via Network 115. The link is configured to be selected at Computing Device 110B and to provide a user of Computing Device 110B an option to download an application and/or data. For example, the link is optionally used to provision an associated application on Computing Device 110B.

In various embodiments, the link is configured to download a combination of Interface Adaption Logic 140, Data Transfer Logic 145, Assignment Logic 150, State Logic 155, and/or Setup Logic 160. For example, the Hyperkey Chat 2.0™ application is configured to provide a virtual keyboard including a shortcut-key on a first computing device. This shortcut-key is configured for providing a link to a user of a second computing device. The link is configured for downloading the Hyperkey Chat 2.0™ application on the second computing device. In another example, a popular application, e.g., SnapChat™ including a combination of the various logical elements discussed above, is configured to generate a virtual keyboard having a shortcut-key for providing a ling to a user of a second computing device. This link is configured for providing an instance of the SnapChat™ application (with or without the various logical elements) to the second computing device. This greatly simplifies the sharing of applications between users.

A virtual keyboard can include one or more shortcut-key configured to provide links from a first user to a second user. The links may each be configured to provide the second user with a different application or different suite of applications. Further, the links provided to the second user may also, or alternatively, be configured for accessing other types of content. For example, a link may be configured for connecting the first and second users in a social network. A link may be configured for providing contact information of the first user to the second user. A link may be configured for providing a payment and/or a prepaid item. A link may be configured for providing a song, video, software, images, user identifier, account identifier, passcode, and/or the like.

In some embodiments, selection (e.g., clicking on) a shortcut-key configured to provide a link to a second user results in automatic copying of the link from Storage 165 to an input field of Base Application 120A. In some embodiments, selection of a shortcut-key results in copying of the link to a copy/paste buffer of Operating System 135 or Base Application 120A. In this case a "Paste" operation can then be used to copy the link from the buffer to the input field.

FIG. 2 illustrates a Messaging Application 210 including a Virtual Keyboard 215, according to various embodiments of the invention. This specific example shown is the current default keyboard on the Apple iPhone®. This virtual keyboard is shared as an extension between a variety of iPhone compatible applications and can be exchanged for alternative keyboards having different character sets or a set of graphics (e.g., smileys). These keyboards are provided by the iOS operating system.

FIG. 3 illustrates Messaging Application 210 including an Adapted User Interface 220 having plurality of Shortcut Icons 225, according to various embodiments of the invention. Each of the Shortcut Icons 225 identifies a shortcut-key of the Adapted User Interface 220. Interface Adaption Logic 140 has been used to replace the Default Interface 215 (e.g., a virtual keyboard) with the Adapted User Interface 220. Each of the Shortcut Icons 225 is configured for execution of a different member of Dependent Applications 125. When one of the Shortcut Icons 225 is touched (or clicked on) by a user, a command is sent to Interface Adaptation Logic 140 to initiate execution of the associated member of Dependent Applications 125 and to replace the Adapted User Interface 220 with a different adapted user interface to the respective member of Dependent Applications 125.

The set of Shortcut Icons 225 illustrated in FIG. 3 optionally represent a menu of Dependent Applications 125 that have been selected by a user using Setup Logic 160. The user may select one, two, three or more Dependent Applications 125 for inclusion in this menu. The Shortcut Icons 225 illustrated represent a messaging application (225A, snap chat), a graphics program (225B, paint), a game (225C, tick-tack-toe), an e-commerce application (225D, Yelp), a music program (225E, Spotify), a translation application (Google Translate, 225F), a photo sharing application (225G, Instagram), a social networking application (225H, Facebook), a GIF application (225K, GIPHY), and a file sharing application (225J, dropbox). Any of these applications may be accessed using an adapted user interface from within the illustrated messaging application. As such, information accessed in these applications can manually or automatically be included in the text exchange of Messaging Application 210. For example, a photo accessed in Instagram can be provided to the input field of Messaging Application 210 and sent as a message using the functionality of Messaging Application 210.

Figure 4:
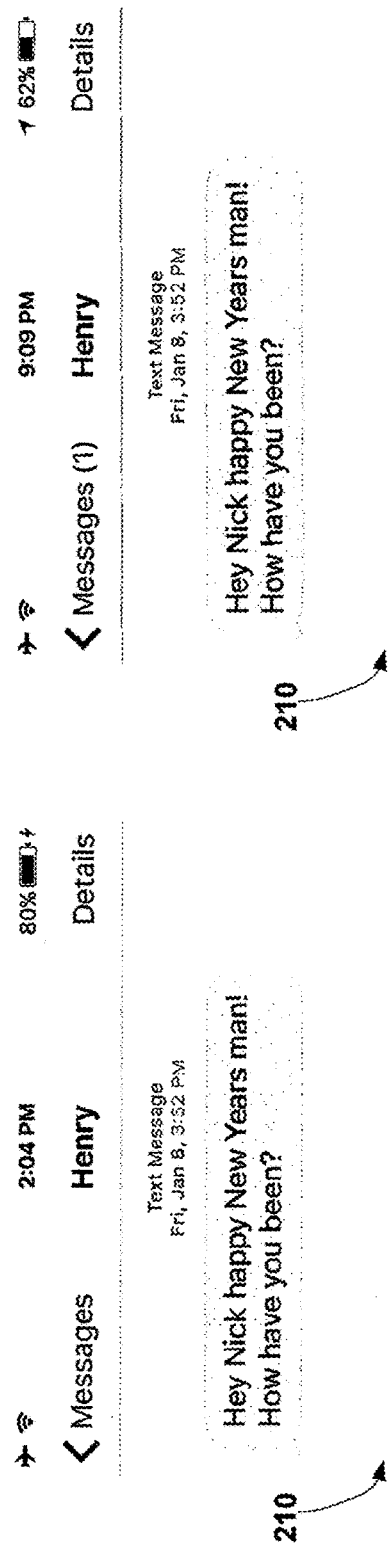
FIG. 4 illustrates a messaging application in which a virtual keyboard has been replaced by a user interface to a graphics application, according to various embodiments of the invention.

FIG. 4 illustrates a messaging application in which a virtual keyboard has been replaced by an Adapted User Interface 410 to a graphics application, according to various embodiments of the invention. Note that Adapted User Interface 410 has replaced the virtual keyboard but not all of the interface of the messaging application, i.e., the prior texts are still shown. As shown elsewhere herein, the adapted user interface may occupy part or all of a prior default interface. In the example illustrated, the adapted interface of the graphics application has replaced the virtual keyboard interfaces illustrated in FIGS. 2 and 3.

The Adapted User Interface 410 of the graphics application optionally provides full functionality of the graphics application. Specifically, the Color Slider Bar 420, Trash Icon 430, Save Button 440 and Reset Icon 460 can each be operated by touching Display 130. In addition the Drawing Field 460, can be used to draw. In the illustrated example the word "Hello" has been drawn in Drawing Field 460 by touching the screen of Display 130. Interface Adaptation Logic 140 is configured to properly match touch locations on Display 130 to the proper input coordinates to the graphics application. Graphical user interface functionality that is dependent on location with Display 130 is, thus, preserved.

FIGS. 5A and 5B illustrate transfer of a Graphic (Hello) 510 hand written using the graphics application of FIG. 4 from Dependent Application 125A to Base Application 120A, according to various embodiments of the invention. The transfer may be manual (as illustrated) or automatic. In manual transfer the output of Dependent Application 125A is copied to the operating system cut/paste buffer and then pasted into the input field of the Base Application 120A. FIG. 5A illustrates an acknowledgement of the copy operation and presentation of a "paste" option. FIG. 5B illustrates the result of the paste option. The graphic image "Hello" has been passed into the Input Field 538 of the messaging application (Base Application 120A) and sent to an external device using the communication features of the messaging application. The image is typically moved from Dependent Application 125A by Data Transferred Logic 145 to a copy/paste buffer where it is then transferred under the control of a user to Base Application 120A using a paste operation.

In automatic transfer of an output of Dependent Application 125A to an input of Base Application 120A the adapted interface mimics a default interface (e.g., a keyboard or GUI) of Base Application 120A. For example, if Base Application 120A is configured to accept characters, gifs and images from the default user interfaces of Base Application 120A, then the adapted user interface of Dependent Application 125A can provide the same data types in place of the default user interfaces. In this example, Data Transfer Logic 145 can move content from Dependent Application 125A to an input of Base Application 120A without requiring further user input.

Figure 6A:
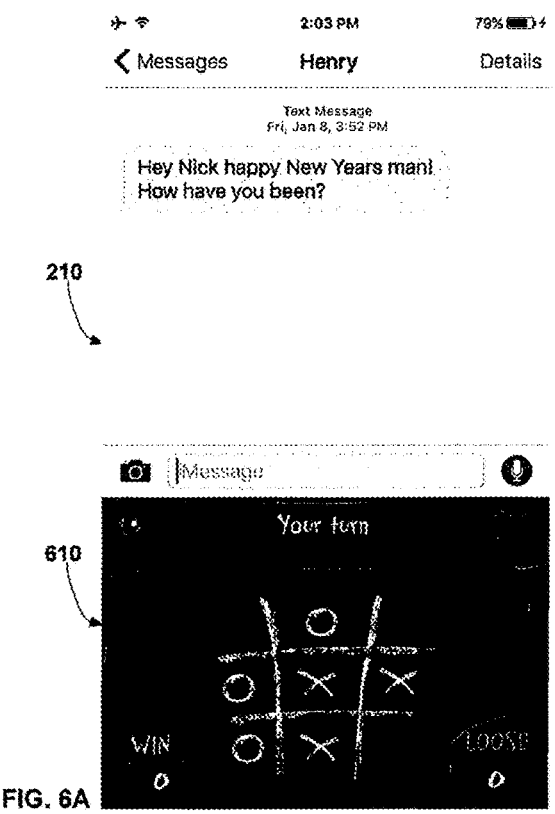
FIG. 6A illustrates a messaging application in which a virtual keyboard has been replaced by an interface to a game application, according to various embodiments of the invention.

FIG. 6A illustrates an instance of Messaging Application 210 in which Default Interface 215 has been replaced by an Adapted User Interface 610 to a (tick-tac-toe) game application, according to various embodiments of the invention. This Adapted User Interface 610 is a touch sensitive interface in which a player can touch locations on Display 130 to place an "X" or an "O". Such a touch results in a change in game state that can be communicated using Data Transfer Logic 145 and/or State Logic 155. The game state may be communicated to Server 195 and/or Computing Device 110B, thus allowing multiple players to play together from different devices. As noted elsewhere herein, this communication can use the communication functionality built into Messaging Application 210 or can be made through a separate communication channel coupled to Dependent Application 125A (which includes the tic-tac-toe game logic). Optionally, the players playing the game of the Dependent Application 125A are the same users that are participating in the chat messaging session of the Base Application 120A. Data Transfer Logic 145 may be configured to identify participants (users or devices) in a communication taking place in Base Application 120A and direct output of Dependent Application 125A to the same users or devices.

Figure 6B:
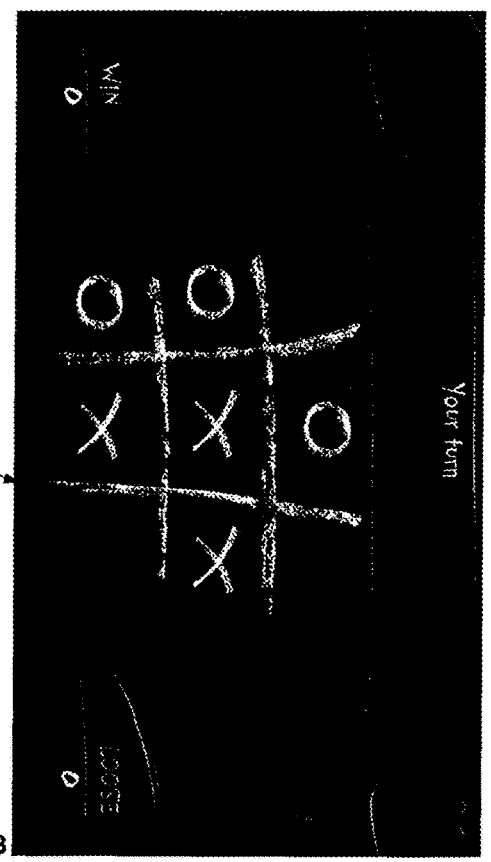
FIG. 6B illustrates the game application interface of FIG. 6, modified in response to a device rotation, according to various embodiments of the invention.

FIG. 6B illustrates the game application interface of FIG. 6A, modified in response to a device rotation, according to various embodiments of the invention. In response to the rotation of Computing Device 110A, the adaption of the user interface to Dependent Application 125A is change to occupy more of Display 130. In some embodiments, the fraction of Display 130 occupied by the adapted interface is changed from less than 33% to more than 90% of the display area.

Figure 7A:
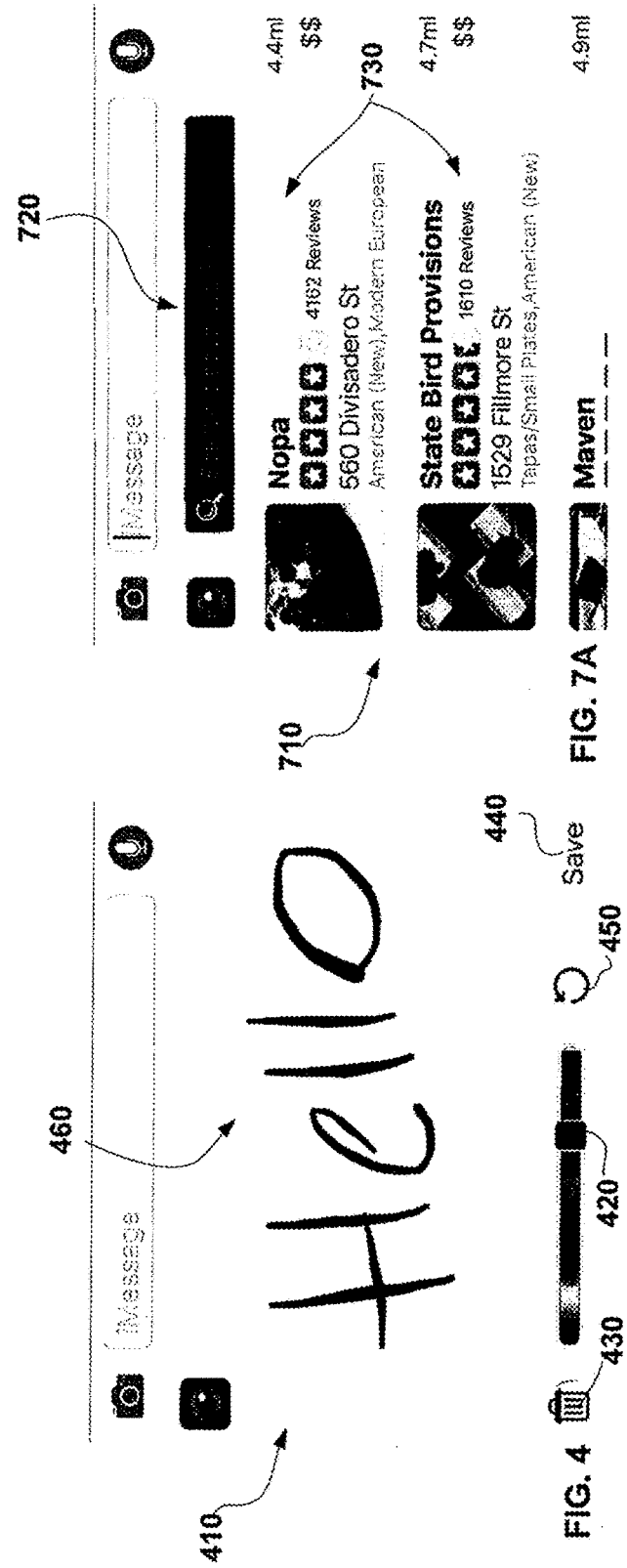
FIG. 7A illustrates an e-commerce interface generated in response to a keyword search, according to various embodiments of the invention.

FIG. 7A illustrates an instance of Messaging Application 210 in which Default Interface 215 has been replaced by an Adapted User Interface 710 to an e-commerce application (Yelp), according to various embodiments of the invention. The instance of Adapted User Interface 710 shown is generated in response to a search on a keyword. It includes a Search Field 720, and a plurality of Active Regions 730 that can be touched (clicked on) to retrieve further content under the control of the Yelp application. If selection of one of Active Regions 730 results in execution of a browser application to view a website, the browser application may be presented to the user within a new adapted user interface (replacing Adapted User Interface 710) or the browser application may be executed directly resulting in closing of Messaging Application 210. The Adapted User Interface 710 illustrated in FIG. 7A and The Adapted User Interface 410 illustrated in FIG. 4 both represent non-keyboard interfaces to third party applications that replace the default virtual keyboard of Messaging Application 210 and are embodiments of Adapted User Interface 220.

The ability to access a Dependent Applications 125 via an adapted user interface from within Base Applications 120 enables synergistic use of the two applications. An example of such synergy, discussed briefly elsewhere herein, is the use of game applications in conjunction with messaging or social networking applications. A social networking application can be accessed from within a game application and vice versa. This allows reporting of game activity (e.g., posting of a high score) in messaging or social networking. It also allows the playing of games with a user's messaging or social networking contacts. These features are enabled even with third party messaging or social networking applications.

Figure 7C:
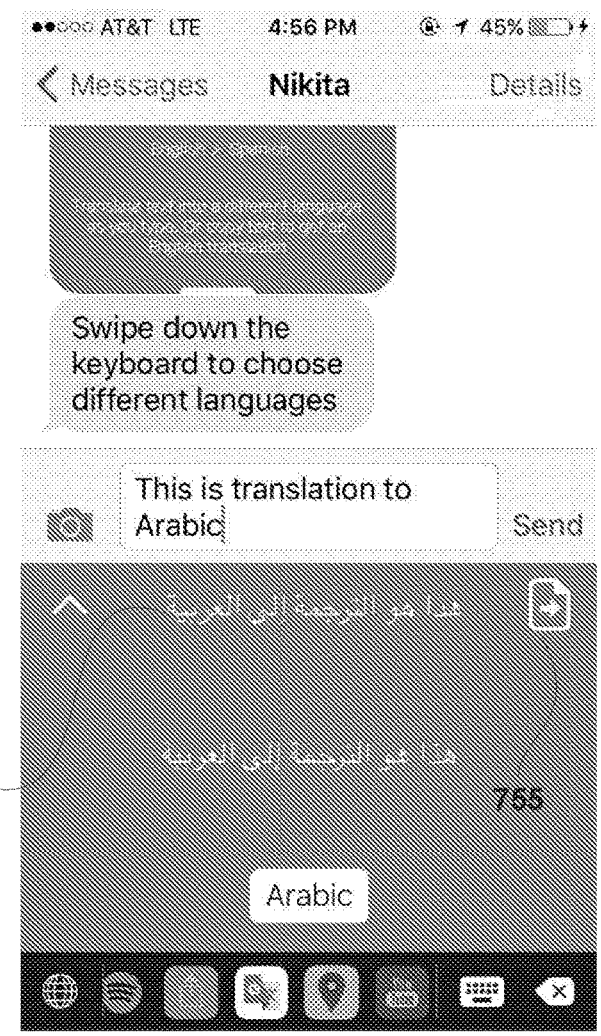

FIGS. 7B-7D illustrate examples of translating text using a keyboard extension, according to various embodiments of the invention. In these embodiments, Adapted User Interface 220 includes a Language Selection Menu 725 from which a user can select a specific pair of languages to translate between. A selection of "Arabic" is shown. Text 730 typed on Input Field 538 of Base Application 120A and is shown in this field in a first language. A Translation 735 of this Text 730 is optionally displayed in Adapted User Interface 220, as shown in FIG. 7C, as the text is entered in Input Field 538. Using an Transfer Icon 755, the Translation 735 is copied into the Input Field 538 replacing the original text. The "Send" command of Base Application 120A can then be used to communicate the Translation 735 to Computing Device 110B, as illustrated in FIG. 7D. In the example illustrated in FIG. 7C, the Arabic translation of "Example of translation" has been sent by the Messaging Application 210. In FIG. 7D further Text 739 is being typed in to the Input Field 538 of Messaging Application 210. Text 739 is translated from English to Minon. The translation of the Text 739 can occur either word by word or when the entire phrase is completed. For example, in FIG. 7D a Translation 741 is shown in the Adapted User Interface 220 as the English Text 739 is being typed. Selecting a Transfer Icon 755 results in the automatic replacement of the Text 739 in Input Field 538 by the Translation 741. The translation can then be sent to Computing Device 110B via the communication capabilities of Computing Device 110A and Base Application 120A. See FIG. 7F. The translation functionality illustrated in FIGS. 7B-7D is evoked by selecting Shortcut Icons 225F or 225L of Adapted User Interface 220.

In some embodiments, the translation is performed using Translation Logic 148 disposed on Computing Device 110A. Alternatively, all or part of the translation may be performed using a third party and/or external service. For example, in the implementation illustrated in FIGS. 7B-7D the Text 730 may be provided over Network 115 to an API of the Google Translate™ service provided by Google, Inc. The translation is performed by this service and Translation 735 is received back via Network 115. These communications are typically managed by Data Transfer Logic 145. Translation using an external API is an example in which Dependent Application 125A comprises Adapted User Interface 710 and Data Transfer Logic 145, but much of the logic (e.g., Translation Logic 148) that performs the operations on the input is external to Computing Device 110A.

This approach of sending Text 730 to a remote system for processing may be applied to other types of processing text and/or other content. For example, processing may include encryption/decryption, search, changes in font, tagging of images, grammar/spelling correction, conversion to braille, database queries, text replacement (e.g., replacement of a code or acronym with a longer text stream), replacement of text with audio data, replacement of text with image data, voice to text conversion, and/or the like. For example, in some embodiments, Data Transfer Logic 145 is configured to send text entered in Adapted User Interface 710 to a text-to-audio conversion service on Server 195. In response, audio data is received by Computing Device 110A and provide to Input Field 538 of Base Application 120A. Both the received audio and the original text are optionally communicated to a remote destination using Base Application 120A. In another example, an image provided to Adapted User Interface 220 is sent to a remote imaging tagging service. In response, image tags, characterizing content of the image, are received by Computing Device 110A. These tags may be communicated to Computing Device 110B (with or without the image) by Base Application 120A. These tags may be used to classify the user of Computing Device 110A, e.g., this user has an interest in motorcycles. These tags may be used to select advertisements for presentation to the user. These advertisements can include Shortcut Icons 225 displayed on Adapted User Interface 220. These tags may be stored as a "cookie" on Computing Device 110A.

Text received via Base Application 120A may also be translated using the Adapted User Interface 220. For example, if a text message is received in Base Application 120A, Data Transfer Logic 145 can be configured to retrieve this text and provided it to Translation Logic 148. The output of Translation Logic 148 is then displayed on Adapted User Interface 220. This allows a translated 2-way communication, even if both parties in the communication do not have an instance of Adapted User Interface 220, Data Transfer Logic 145, and/or Translation Logic 148.

In various embodiments, Data Transfer Logic 145 and Translation Logic 148 are configured to perform translations for communication sessions involving more than two parties. In these embodiments, Text 730 may be translated into more than one language and different Translations 735 are sent to different parties.

Figure 7E:
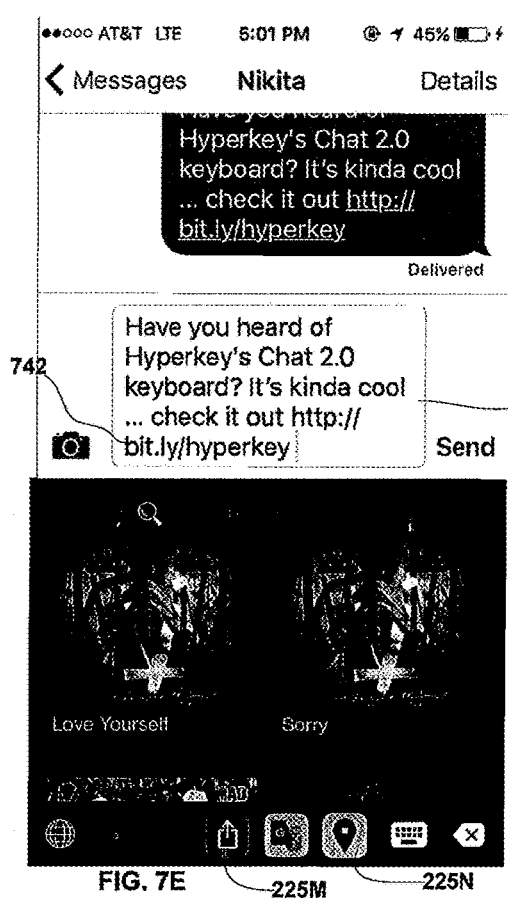
FIG. 7E illustrates an example of sharing an application, according to various embodiments of the invention.

FIG. 7E illustrates an example of sharing an application, according to various embodiments of the invention. The application is shared by passing of a Link 742 to Base Application 320A and communication of the Link 742 from Computing Device 110A to Computing Device 110B via Network 110. Link 742 is configured for a user of Computing Device 110B to retrieve or access the shared application. In FIG. 7E a Shortcut Icon 225M has been selected on Computing Device 110A. The selection of Shortcut Icon 225M causes Data Transfer Logic 145 to retrieve Link 742 from Storage 165. Link 742 is automatically placed in an Input Field 538 of Base Application 120A and/or in a copy/paste buffer. As illustrated in FIG. 7E, the link can include a URL (http://bit.ly/hyperkey) and explanatory text ("Have you heard of Hyperkey's Chat 2.0 keyboard? It's kinda cool . . . check it out." From Input Field 756 Link 742 can be sent to one or more destinations using Base Application 120A, e.g., sent to Computing Device 110B. "bit.ly" is a redirection service configured to redirect a request to a destination based on the "hyperkey" token.

The Link 742 is configured to downloading and/or accessing an application. This application may be Base Application 120A, Base Application 120B, Dependent Application 125A, Dependent Application 125B, and/or some other application. In some embodiments, Link 742 is a link to a webpage from which the application can be downloaded (or to a website configured to redirect a request to a webpage from which the application can be downloaded). For example, Link 742 as illustrated in FIG. 7E is a link to a redirection site that is configured to redirect a request received from an device running the Apple operating system (iOS) to a page of the Apple iTunes store from which the HyperKey™ application can be downloaded. Thus, Data Transfer Logic 145 is used to share an application that includes further instances of Data Transfer Logic and/or Interface Adaptation Logic 140. This greatly simplifies the sharing and distribution of applications.

In some embodiments, Link 742 is configured for accessing a network based application, e.g., one that does not necessarily need to be downloaded to Computing Device 110A or 110B to be executed. For example, Link 742 may be to an API of an application provided as Software as a Service (SAS). An example of such a service is evite.com, which allows users to purchase tickets and schedule events via an online portal. Using the systems and methods illustrated in FIG. 7E users can share Links 742 to specific tickets, events, content, promotions, etc.

In some embodiments, Dependent Application 125A is available for download in an edition that includes the HyperKey™ application (e.g., a combination of State Logic 155, Setup Logic 160, Data Transfer Logic 145, Interface Adaptation Logic 140, and/or Assignment Logic 150, etc.) as an add-on or extension. In these embodiments, Adapted User Interface 220 can include Shortcut Icon(s) 225 configured for accessing Dependent Application 125A from within Base Application 120A and/or for sharing of Dependent Application 125A with other users. One of Shortcut Icons 225 may be configured for accessing and application while another of Shortcut Icons 225 may be configured for sharing the application.

Link 742 optionally includes metadata configured to identify a source of Link 742, when Link 742 was shared, identities of Base Application 130A or Dependent Application 125A, user characteristics, a user identifier, and/or the like. This information may be used for tracking how an application is shared, who shares the application, and to give credit for sharing the application. In some embodiments, activation of Link 742 on Computing Device 110B is configured to communicate the identity of an Operating System 135 of Computing Device 110B to a third party, such that a version of an application appropriate for that Operating System 135.

In some embodiments, Link 742, or any other link shared using Data Transfer Logic 145, includes tokens indicating a payment status. This payment status may include an indication that a product or service has been paid for by the sender or that a discount should be provided. For example, in some embodiments, a first user can pay for Dependent Application 125B and send Link 742 to a second user, where this instance of Link 742 allows the second user to download/access Dependent Application 1256 without paying full price. Thus, the first user can send an application to a second user such that the first user pays for the application.

This approach to sending a product or service, where the sender pays, allows the sender to send a gift to the second user. The product or service sent can include any product or service including, for example, software, hardware, flowers, candy, clothing, books, virtual items, credit at a website, movies, images or cash. In one example, Link 742 includes a token (e.g., digital code) that allows a recipient to order a physical or digital book from a third party website, at no or reduced cost. Such tokens optionally include one-time encrypted certificates. In another example, Link 742 includes a token that allows a recipient to download music or video.

In alternative embodiments, Link 742 may include a request for a gift or payment. For example, a first user may request that a second user pay for a product or service to be received by the first user. Consider an instance of Dependent Application 125A that includes a ticket service such as evite.com. A first user may identify tickets they wish to purchase and then send a payment link (e.g., Link 742) to a second user. The second user can use this link to access a payment portal and make the requested payment. Once the payment is make, the first user is notified by the ticketing service (or via a receipt link from the second user) that the payment has been made. In a more specific example, a student can send a request to a parent to purchase a specific textbook. The request including an instance of Link 742 and being generated by an embodiment of Dependent Application 125 that includes a book shopping client. The parent can choose to pay for the textbook using the received Link 742 and, as a result, the textbook is provided to the student via a method pre-specified by the student. In this case, the Link 742 typically includes (or is configured to retrieve) information such as an order number, payment amount, account information, and/or the like.

In some embodiments, Dependent Application 125A is configured for purchasing products or services. For example, Dependent Application 125A may be associate with a commercial website or enterprise, and configured to make purchases therefrom. Using embodiments of Computing Device 110A a purchased product or service may be provided to a user of Computing Device 110B. In a specific example, a first user can access an embodiment of Dependent Application 125A configured for purchasing flowers, the access being through an Adapted User Interface 220 of Base Application 120A. The first user uses this embodiment to purchase flowers and when the purchase is complete is provided with an embodiment of Link 742 that indicates that the flowers have been paid for. The first user then automatically or manually places this Link 742 in an input field of Base Application 120A. From the input field the placed Link 742 is communicated to Computing Device 110B using communication features of Base Application 120A. At Computing Device 110B, Link 742 can be used to provide an address for delivery of the flowers, choose different flowers, etc. Purchases can include any of the products or services discussed herein, including Dependent Applications 125.

Figure 7F:
FIG. 7F illustrates an example of sharing a device location, according to various embodiments of the invention.

FIG. 7F illustrates an example of sharing a device location, according to various embodiments of the invention. In these embodiments, a location of Computing Device 110A is communicated to Computing Device 110B using Base Application 120A and Dependent Application 125A, or using Base Application 120A and Operating System 135. The location is optionally derived from a service controlled by Operating System 135. For example, many mobile phones are configured to determine their position using GPS or cellular tower data. As illustrated in FIG. 7F, the location can be communicated via a Text String 744 that includes a physical address. Using Data Transfer Logic 145, this location is copied into an input field of Base Application 120A using Dependent Application 125A. In other embodiments, the location communicated includes a map image, map coordinates and/or a name of something at of the location. For example, a longitude and latitude or a restaurant name. At Computing Device 110B, the location is optionally used to retrieve a map indicating the location.

While FIG. 7F illustrates a communication of a location, Data Transfer Logic 145 is optionally configured to place other information obtained from Operating System 135 and/or hardware of Computing Device 110A into an input field of Base Application 120A. For example, data obtained from a camera, motion sensor or fingerprint reader, a MAC address, a cellular identification number, and/or the like may be placed into the input field using Adapted User Interface 210 and Data Transfer Logic 145. The placed data can include text and/or an encoding of the communicated information.

FIG. 8 illustrates a method of executing an application, according to various embodiments of the invention. In this method, Dependent Application 125A is accessed from within Base Application 120A via an adapted user interface. A user input provided through the adapted user interface is optionally used to update a state of Dependent Application 125A and this updated state may be communicated to other Computing Devices 110 and/or Server 195. The method illustrated in FIG. 8 is optionally performed using Computing System 100. The steps illustrated in FIG. 8 are optionally performed in different orders.

In an Execute Base Application Step 810, Base Application 120A is executed on Computing Device 110A. The execution is supported by Operating System 135 and may include use of a default user interface provided by Operating System 135. For example, Base Application 120A may receive a virtual keyboard interface from Operating System 135 as an application extension.

In a Retrieve Adapted Interface Step 815, an adapted user interface is received by Base Application 120A. The received interface is typically adapted and provided by Interface Adaption Logic 140. The received interface is optionally adapted from a default interface of Dependent Application 125A and adapted to replace all or part of the default interface of Base Application 120A. For example, the adapted user interface may be adapted to replace the virtual keyboard received from Operating System 135. The types of adaptation that may be made to the user interface can include any of the adaptations discussed elsewhere herein. The adapted user interface may include a keyboard or may be a non-keyboard user interface.

The adapted user interface is optionally received from a source external to Base Application 120A. For example, the adapted user interface is typically received from Interface Adaptation Logic 140 rather than originally from Operating System 135. In some embodiments, the adapted user interface also includes at least one functional link to Dependent Application 125A. As used herein, the term "functional call" means that the adapted user interface is configured to execute a function within Dependent Application 125A, configured to exchange data with Dependent Application 125A, configured to pass a user input to a function within Dependent Application 125A, and/or configured to receive an output from a function of Dependent Application 125A. In various embodiments, the adapted user interface includes 1, 2, 3 or more functional calls to Dependent Application 125A. As discussed elsewhere herein, Data Transfer Logic 145 may be configured to transfer a link to an input field of Base Application 120A. This link optionally includes data configured to be operated on by an external application.

In a Replace Interface Step 820, all or part of the default user interface of Base Application 120A is replaced by the adapted user interface received/retrieved in Retrieve Adapted Interface Step 815. The adapted user interface is added to the Base Application 120A such that the Base Application 120A can treat the adapted user interface as the replaced default user interface. For example, Base Application 120A may receive inputs originated at the adapted user interface and process these inputs as if they were received from a default interface. Optionally, the adapted user interface is adapted to communicate to the same API of Base Application 120A as the default user interface (of Base Application 120A) provided by Operating System 135.

In a Receive Input Step 825, an input from a user is received at the adapted user interface. This occurs while the adapted user interface is display within Base Application 120A. The input may be a touch to Display 130 that is interpreted to be at a specific location within the adapted user interface by interface Adaptation Logic 140. For example, the input may be a touch at a location of an icon or a key of a virtual keyboard. In alternative embodiments, the input can include an image, audio data, the result of a paste operation, and/or the like.

In a Pass Input Step 830, the input received in Received Input Step 825 is passed to Dependent Application 125A. This may be accomplished using Interface Adaptation Logic 140 and/or Data Transfer Logic 145. The input is optionally modified by Data Transfer Logic 145 prior to being provided to Dependent Application 125A. For example, Data Transfer Logic 145 may be configured to perform a remapping of screen coordinates, to remove metadata from and/or add metadata to the input, and/or to perform some other transformation on the input data.

In a Process Input Step 835, the input received in Pass Input Step 830 is processed using functions of Dependent Application 125A. These functions are typically default functions of Dependent Application 125A. For example, these functions can be functions used by Dependent Application 125A when Dependent Application 125A is executed as an independent standalone application (e.g., directly through Operating System 135, not through one of Base Applications 120). Optionally, the processing results in an output of Dependent Application 125A. This output can include text, commands, images, gifs, graphics, audio, and/or any other data type.

In a Provide Output Step 840, the output of Dependent Application 125A is provided to a user via the adapted user interface, to State Logic 155, to Computing Device 110B, to Server 195, to Base Application 120A, and/or the like. For example, in some embodiments, the output of Dependent Application 125A is provided to the default user interface of Base Application 120A, e.g., to an API of Base Application 120A.

In an optional Modify State Step 845, a state of Dependent Application 125A is modified based on the user input received in Receive Input Step 825. The state may be modified before or after Process Input Step 835. In one example, the state of a game application is modified based on processing of a user input received at the adapted user interface.

In an optional Communicate State Step 850, the modified state of Dependent Application 125A is communicated to Computing Device 110B. This communication may be via Network 115, may be via a communication function of Dependent Application 125A, and/or may be via a communication function of Base Application 120A. All or part of the modified state may be communicated. The modified state is optionally communicated via Server 195.

In an optional Update State Step 855, the state of an application executing on Computing Device 110B is updated using the state information received in Communicate State Step 850. For example, an instance of Dependent Application 125A executing on Computing Device 110B may be updated based on state information received from Computing Device 110A. In some embodiments, Update State Step 855 is used to synchronize the state of a computer game on a plurality of different Computing Device 110B.

FIG. 9 illustrates a method of executing Dependent Application 125A from a virtual menu, according to various embodiments of the invention. The virtual menu is optionally included in a first adapted user interface within Base Application 120A. When Dependent Application 125A is executed, the first adapted user interface may be replaced by a second adapted user interface within Base Application 120A. The second adapted user interface being an interface to Dependent Application 125A. The steps illustrated in FIG. 9 are optionally performed in different orders.

In a Select First Application Step 910, a first application is selected from a plurality of applications. The plurality of applications may include third party applications installed on Computing Device 110A. The plurality of applications may also include default applications (default to Computing Device 110A), such as a browser application, test messaging application, e-mail application, music application, camera application, and/or phone application, which come installed on Computing Device 110A.

In an Adapt First Interface Step 915, a user interface of the first application is adapted for use within Base Application 120A. As is described elsewhere herein, adaption of a user interface may include a variety of modifications to the interface and may include the use of one or more adaptation templates. The adapted user interface, and/or rules found to result in a successful adaptation of the user interface are optionally stored in Storage 165.

In an optional Select Second Application Step 920, a second application is selected from the plurality of applications. Select Second Application Step 920 is typically performed in a manner similar to Select First Application Step 910 and may be performed contemporaneously with Step 910. Select First Application Step 910 and Select Second Application Step 920 are optionally performed using Setup Logic 160. The selections are optionally made by viewing a list of installed and/or compatible applications and choosing those that the user wishes to use as Dependent Applications 125A. In some embodiments, the selection is limited to applications that have been previously confirmed as having a user interface that is compatible with adaptation for inclusion within Base Application 120A.

In an optional Adapt Second Interface Step 925, a user interface of the second application is adapted for use within Base Application 120A. Adapt Second Interface Step 925 is similar to Adapt First Interface Step 915. In various embodiments, three or more applications are selected and their user interfaces adapted for use within Base Application 120A.

In an Adapt Default Interface Step 930, a default user interface of Base Application 120A is adapted by inclusion of a menu for selection of the first application and optionally the second application (and optionally further applications). This menu may take the form of a set of Shortcut Icons 225 such as those illustrated in FIG. 3. Each of the Shortcut Icons 225 are configured such that their selection will result in execution of the associated application, for example as Dependent Application 125A.

In a Replace Default Interface Step 935, the default user interface of Base Application 120A is replaced by the adapted version of this user interface. An exemplary result of Replace Default Interface Step 93 can be seen by comparing FIGS. 2 and 3. In these figures, Default Interface 215 has been replaced by Adapted User Interface 220 within an instance of Base Application 120A that includes a messaging application. The Adapted User Interface 220 includes Shortcut Icons 225 to a variety of different applications.

In an optional Receive Selection Step 940, a user selection of the first application is received at the adapted user interface of Base Application 120A, e.g., at Adapted User Interface 220. This selection may be made by the user clicking on the one of Shortcut Icons 225 associated with the first application. The selection is passed to Data Transfer Logic 145, Interface Adaptation Logic 140, and/or Setup Logic 160.

In an optional Execute Step 945, the first application is executed as Dependent Application 125A. The user interface to the first application is the adapted user interface generated in Adapt First Interface 915. In some embodiments, Adapt First Interface Step 915 is performed in response to Execute Step 945.

In some embodiments, Execute Step 945 results in insertion of a link into an input field of Base Application 120A or copying of a link to a copy/paste buffer within Computing Device 110A. As noted elsewhere herein, this link can include a wide variety of information and is optionally configured for sharing of an application, a product, a service, and/or data. For example, the link may be configured for communicating contact information and/or sharing Dependent Application 125A.

In an optional Replace Adapted Interface Step 950, the adapted default interface of Base Application 120A (which replace the default interface in Replace Default Interface Step 935) is replaced by the adapted user interface of the first application (which was adapted in Adapt First Interface Step 915). In Replace Adapted Interface Step 950 one adapted user interface that includes a menu of applications is replaced by an adapted user interface to one of those applications. In a specific example, the Adapted Default Interface 220 illustrated in FIG. 3 may be replaced by the Adapted User Interface 710 illustrated in FIGS. 7A-7F or the Adapted User Interface 410 illustrated in FIG. 4.

Following Replace Adapted Interface Step 950, steps illustrated in FIG. 8 are optionally executed. For example, Steps 825-855 may be performed using the adapted interface to Dependent Application 125A.

Figure 10:
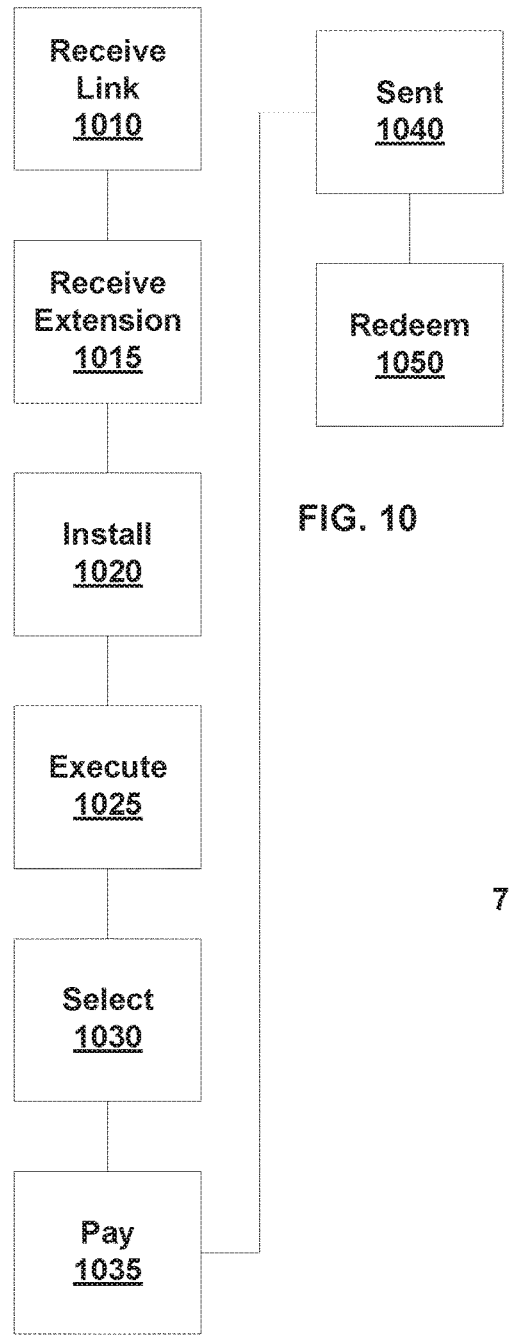
FIG. 10 illustrates a method of sharing an application using a virtual keyboard, according to various embodiments of the invention.

FIG. 10 illustrates a method of sharing an application using a virtual keyboard (e.g., Adapted User Interface 220), according to various embodiments of the invention. This method is optionally used to share applications between Computing Devices 110. The method includes passing of a link from Computing Device 110A to Computing Device 110B. The link is configured for provisioning the shared application on Computing Device 110B and/or for accessing the shared application from Computing Device 110B. The link is optionally communicated from Computing Device 110A to Computing Device 110B via a text messaging application and/or via an Adapted User Interface 210. The methods illustrated by FIG. 10 are optionally adapted for sharing products or services other than applications.

In an optional Receive Link Step 1010 a link is received at Computing Device 110A. The received link is configured for provisioning an application including Interface Adaptation Logic 140 and/or Data Transfer Logic 145 on Computing Device 110A. The application may have a primary purpose of providing the keyboard extension discussed herein. Alternatively, the application may have some other purpose and Interface Adaptation Logic 140 and/or Data Transfer Logic 145 are included as an optional feature or extension. For example, the received link may be configured for downloading the LinkedIn mobile client on Computing Device 110A and this client is downloadable in a package that includes State Logic 155, Setup Logic 160, Assignment Logic 150, Interface Adaptation Logic 140 and/or Data Transfer Logic 145. The received link is optionally further configured for provisioning Dependent Application 125A or Base Application 120A. The link received in Receive Link Step 1010 is optionally received via a social networking, text messaging or e-mail application. The link may be to an FTP (file transfer protocol) site, to a webpage configured for downloading the application, or to a redirection site. Receive Link Step 1010 is optional as Interface Adaptation Logic 140 and/or Data Transfer Logic 145 may alternatively be selected from a website or a portal such as the iTunes store, etc.

In a Receive Extension Step 1015 a keyboard extension is received at Computing Device 110A. The keyboard extension includes at least Interface Adaptation Logic 140 and/or Data Transfer Logic 145, and optionally includes State Logic 155, Setup Logic 160, and/or Assignment Logic 150. The keyboard extension may be received as a stand-alone program, e.g. the HyperKey application, or as an optional feature of another application. The keyboard extension is optionally received in a package that also includes Dependent Application 125A or Base Application 120A. The keyboard extension may be received from a portal such as the iTunes store or Google App Store. The keyboard extension may be received as a result of selecting a link received in Receive Link Step 1010.

The keyboard extension is configured for presenting Adapted User Interface 220 within Base Application 120A. The keyboard extension includes one, two or more Shortcut Icons 225 configured for accessing Dependent Applications 125A and/or 125B from within Adapted User Interface 220. The Adapted User Interface 220 having replaced Default Interface 215 of Base Application 120A. In some embodiments, one of the Shortcut Icons 225 is an instance of Shortcut Icon 225M. One or more of the Shortcut Icons 225 are configured for placing a link into and input field of Base Application 120A. For example, Shortcut Icon 225M may be configured for placing Link 742 into the Input Field 538, as illustrated in FIG. 7E.

In an Install Step 1020 the keyboard extension is installed on Computing Device 110A. The installation optionally includes use of Setup Logic 160 to select which Shortcut Icons 225 should be displayed within Adapted User Interface 220. In some instances of Computing Device 110A Install Step 1020 includes selection of the keyboard extension as one of a plurality of alternative keyboards. Install Step 1020 can include installation on Computing Device 110A of any application associated with Link 742.

In an Execute Step 1025, Base Application 120A is executed on Computing Device 110A. As noted elsewhere herein, Base Application may be a messaging application, an e-mail application, a social networking application, and/or the like. Execution of Base Application 120A results in presentation of Adapted User Interface 220 on Display 130.

In a Select Step 1030, one of Shortcut Icons 225 is selected (e.g., clicked on) from within Adapted User Interface 220. As noted elsewhere herein, this selection can result in automatic copying of a link to an input field of Base Application 120A, or copying of the link to a copy/paste buffer. The link is optionally configured for provisioning of an application on an instance of Computing Device 110B, or providing any of the other tasks discussed herein. The application to be provisioned can be Base Application 120A, Dependent Application 125, an application whose primary purpose is to provide Interface Adaption Logic 140 and/or Data Transfer Logic 145, and/or any other application executable on Computing Device 110B.

In some embodiments, the application for which the link is configured to download is a social networking application such as the mobile clients of Snapchat™, Instagram™, Facebook™, LinkedIn™, and/or the like. In these embodiments the link is optionally configured to provision the social networking application and/or any parts of the keyboard extension illustrated in FIG. 1, e.g., Interface Adaptation Logic 140 and/or Data Transfer Logic 145. etc. In these embodiments, the link shared via the methods illustrated by FIG. 10 can include a link to a specific account. For example, the link can include a link to download the LinkedIn mobile application and/or a link to the user of Computing Device 110A's personal LinkedIn account. The link optionally includes a predesignated acceptance of a social relationship. As such, a first user of Computing Device 110A can send, to a second user of Computing Device 110B, a link to the first user's social networking account, where that link optionally includes a pre-approved acceptance of a social relationship (e.g., a friend request acceptance). Such embodiments can be applied to other types of social networking accounts such as music sharing and or image sharing accounts. In another example, a YouTube user may provide a link to the user's YouTube account that optionally includes a preapprove acceptance to follow that account.

In an optional Pay Step 1035, the user of Computing Device 110A provides consideration (e.g., payment) for a transaction. The consideration can include a cash payment, a credit card payment, an electronic funds transfer, in kind services, a trade, and/or the like. The payment is optionally made using Dependent Application 125B. For example, payment may be made using a mobile Paypal™ agent accessed via an Adapted User Interface 220 of Base Application 120A.

In some embodiments, multiple Dependent Applications 125 may be accessed via one Adapted User Interface 220. For example, an Adapted User Interface 220 may at the same time, or at alternative times, provide an interface to both Dependent Application 125A and Dependent Application 125B. In a specific example, Adapted User Interface 220 may provide an interface to a shopping application and a payment application at the same time or interchangeably. This allows the payment application to be used in a transaction for the shopping application.

A link provided to the input field of Base Application 120A can include payment data indicating the consideration for a product or service has been prepaid, e.g., prepaid by the sender. Likewise, the link may include a coupon, partial payment, discount code, and/or advertisement.

In a Send Step 1040, the link provided to the input field of Base Application 120A is communicated to Computing Device 110B using communication protocols/channels of Base Application 120A. For example, if Base Application 120A is a text messaging application then the link is communicated to Computing Device 110B using text messaging functions. The link may be sent as a text string, as a multi-media message, etc.

In an optional Redeem Step 1050, the link is used at Computing Device 110B to receive a product or service associated with the link. This may include, for example, opening a download or order page of a website or client application. For example, Redeem Step 1050 may include opening an iTunes client and downloading an application, music and/or other content associated with the link from within iTunes. Alternatively, Redeem Step 1050 may include opening a webpage configured to download a product or to provide a service. For example, a webpage may be configured for a user to provide a delivery address for flowers paid for in Pay Step 1035.

In Redeem Step 1050 the link provided to Computing Device 110B may be used to provision Dependent Application 125A and/or another application on Computing Device 110B. Provisioning optionally includes downloading and installing. For example, the link may be used to retrieve an application from a remote server. The link may be used to provision Interface Adaptation Logic 140 and/or Data Transfer Logic 145 on Computing Device 110B. These logics may be provisioned with or without other applications.

In some embodiments, Redeem Step 1050 includes fetching data from a remote data source or providing data to a remote destination. For example, in some embodiments the link is used to retrieve contact information, a video, images, documents, and/or other content. In these embodiments, the link optionally includes credentials configured to allow access to secure information. Likewise, the link may provide identification of a specific account to a social networking service, optionally along with a pre-approval to connect (e.g., establish a relationship) to that account.

In some embodiments, Redeem Step 1050 includes completing an order, providing a delivery address, or paying for a product or services. This may result in delivery of a product or service to users of Computing Devices 110A and/or 110B. Redeem Step 1050 may also result in a transfer of goods, services and/or payments between these users.

In an illustrative example, Dependent Application 125A is a client application for a coupon service such as Groupon.com. Using Adapted User Interface 220 a user executes Dependent Application 125A from within Base Application 120A. The user then selects a coupon from Dependent Application 125A and copies a link into an input field of Base Application 120A. The link may be copied automatically or via a copy/paste buffer. The link includes data identifying the coupon and characteristics thereof. The link can then be communicated via a communication channel of Base Application 120A to Computing Device 110B. At Computing Device 110B a user can optionally use the coupon to obtain a product or service at a discount.

In another illustrative example, Dependent Application 125A is an application related to music, such as Pandora™, iTunes™, Amazon Music or Spotify™. A user of Dependent Application 125A may select a piece of music and pay for the music in Pay Step 1035. Data certifying that the payment has been made and the identity of the music is then placed in an input field of Base Application 120A as a link. When this link is received at Computing Device 110B, the link may be used to retrieve the music, optionally without further cost to a user of Computing Device 110B.

In another illustrative example, Dependent Application 125A is a client application for an online shopping services, such as eBay.com™ or Amazon.com™. A user of Dependent Application 125A may select a product or service for sale through these services, and then pay for the product or service in Pay Step 1035. A link is then placed in an input field of Base Application 120A. The link includes data, e.g., a certificate or key, certifying that the payment has been made and an identifier of the product or service. This link is communicated to Computing Device 110B using Base Application 120A. At Computing Device 110B the link may be used to complete purchase of the product or service. For example, the link may be configured to open an ordering page within a web browser, the page being configured for providing a delivery address and/or acknowledging the payment by the user of Computing Device 110A.

In another illustrative example, Dependent Application 125A is a client application for a social networking service, such as LinkedIn.com™ or Facebook.com™. In these cases, the link can be configured to access a specific account and optionally include a preapproval to establish a relationship to that account. For example, a user of Computing Device 110B may select the link to open a Facebook application and automatically establish a "friends" connection between the user's account and an account of the provider of the link.

The steps illustrated in FIG. 10 are optionally performed in orders other than illustrated in the figure.

In some embodiments a use or production of a link, e.g. Link 742 requires logging into an account. For example, providing a link to a social networking account that includes a pre-authorized relationship with that account, may first require the that user of Computing Device 110A successfully log into the account. Likewise, a user of Computing Device 110B that receives the above link may be required to log into their own social networking account before establishing a relationship between their account and an account of the sender. In these embodiments, the functionality of Data Transfer Logic 145 may be dependent on a user's login state to a specific account and/or service, and/or the presence of specific credentials on Computing Device 110A.

In an illustrative example, Dependent Application 125A includes a client configured for accessing the Facebook™ social networking service. If a user of Computing Device 110A is logged into they can access their Facebook account via an Adapted User Interface 220 of Base Application 120A. Within this interface, the user can generate a link to invite others to have a "friends" relationship to their Facebook account, and/or share specific content from their account. The generated link optionally includes credentials granting access to specific content within a Facebook account. Such a link is optionally configured for one-time use or for use only from within another specific Facebook account. The link is optionally communicated from Computing Device 110A to Computing Device 110B using an input field of Base Application 120A.

As used herein, a "link" is meant to include a selectable object including an address such as a universal resource locator, an Internet Protocol address, a network address, a MAC address, a QR code, a telephone number, a File Transfer Protocol address, a UDP address, an FTP address, a file path, a script, a short cut, and/or the like. Selection of a link results in retrieval and/or execution of content addressed by the link. In a specific example, a link includes a universal resource locator convertible to an internet protocol address using IP/TCP protocols. Retrieval of content from the internet protocol address, optionally results in redirection to a different address. For example, selection of a link may result in retrieval of content/data from a first addressed location and this content/data may include a different address to a second location to which the process is redirected. In a specific example, the Link 742 illustrated in FIG. 7E includes a URL to a redirection website, which is configured to redirect a selection to a specific location within the Apple App Store or Google Play. The HyperKey Chat 2.0 application can be downloaded from this location.

Referring again to FIG. 1, Computing Device 110A optionally further includes Upload Logic 167 configured to transfer a log of shared data to external devices via Network 115. For example, Upload Logic 167 may be configured to upload a log of data shared from Computing Device 110A by providing an output of Dependent Application 125A to an input field of Base Application 120A and using Base Application 120A to send the data (or a link thereto) to Computing Device 110B or any other device configured to execute Base Application 120A. The transferred log may be generated using Logging Logic 166 and is optionally transferred to and/or via Server 195. The log may be transferred one record at a time or in batches of records, each record representing a data sharing event. The log typically, but not necessarily, include metadata associated with shared objects/data. The operation of Upload Logic 167 may be automatic, not requiring additional user input beyond the act of sharing the data.

Computing Device 110A optionally further includes Setup Logic 160 configured for a user to subscribe to one or more external logs. This selection is typically made from a plurality of external logs generated at a plurality of separate remote devices. In various embodiments, Setup Logic 160 includes a selection menu configured for selecting logs generated by well-known persons, logs generated members of the user's social networks, logs generated by users with whom the users have shared data using the systems and methods described herein, logs of popular data, and/or the like. Setup Logic 160 is optionally configured to suggest logs to a user based on the user's profile. As used herein, the term "external log" is meant to refer to a log that is generated on a device external to the current member of Computing Devices 110. For example, a log that is generated on Computing Device 110B or Server 195.

Computing Device 110A optionally further includes Download Logic 168 configured to download one or more external logs to which a user has subscribed, to Computing Device 110A. The one or more external logs include data transferred between virtual user interfaces on remote computing devices. For example, these external logs can include logs generated by Logging Logic 166 as described elsewhere herein. These external logs are provided as an input stream to Computing Device 110A.

Figure 11A:
FIG. 11A illustrates an adapted user interface including a short-cut key configured to access a log of transferred/shared data, according to various embodiments of the invention.

In some embodiments, Adapted User Interface 220 includes a short-cut key to an instance of Dependent Application 125 specifically configured for accessing the input stream including one or more external input logs, and/or logs generated locally on Computing Device 110A. For example, FIG. 11A illustrates an Adapted User Interface 220 including a Stream Short-cut Key 1110 configured to access logs of transferred/shared data, according to various embodiments of the invention. In the example shown, the logs can include logs generated locally and/or external logs to which the user has subscribed. In the illustrated example, Fields 1115 configured to show two different external logs are shown.

Also shown are two Gifs 1120 in the user's internally generated log of shared data. The example illustrated in FIG. 11A also includes a Short-cut Key 1125 configured to show shared data from logs that the user has indicated as being favorites (e.g., the user has liked).

Figure 11B:
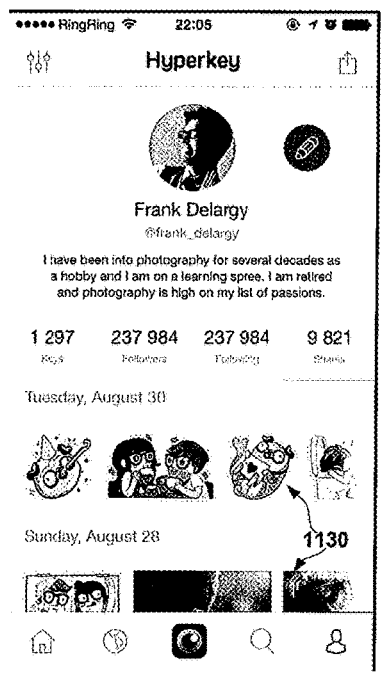
FIG. 11B illustrates an interface configured to view a user's log of transferred/shared data, according to various embodiments of the invention.

FIG. 11B illustrates an interface configured to view a user's Log 1130 of transferred/shared data, according to various embodiments of the invention. The user can remove objects from their log, modify/add metadata associated with objects in their log, restrict distribution of objects in their log (for example designate objects as being R-rated, or only to be exported to a restricted group), count shares of objects within their log, and/or the like. The user may also edit information within their personal profile.

Figure 11C:
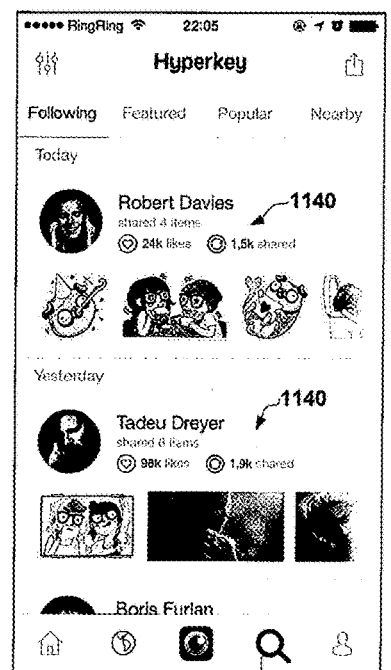
FIG. 11C illustrates a set of external logs subscribed to by a user, according to various embodiments of the invention.

FIG. 11C illustrates a set of External Logs 1140 subscribed to by a user, according to various embodiments of the invention. The External Logs 1140 are indicated as being from users "Robert Davies" and "Tadeu Dreyer." The objects illustrated in the Log 1130 and External Logs 1140 of FIGS. 11A-11C can be copied into the input field of Base Applications 120 using an instance of Dependent Application 125B and communicated to external devices using Base Applications 120, as described elsewhere herein. When an object is retrieved from one of External Logs 1140 and thus shared, the shared data representing that object and any associated metadata is typically added to the user's Log 1130. The user's Log 1130 can include data transferred from a second user interface of Dependent Application 125A to a first user interface of Base Application 120A (and/or 120B), and also data transferred from a third user interface of Dependent Application 125B to the first user interface. Data Transfer Logic 145 is optionally configured to perform transfers of objects/data from Log 1130 and/or External Logs 1140 to the input fields of Base Applications 120A and 120B. FIGS. 11A-11C illustrate user interfaces presented in Display 130. Keys within a virtual keyboard may be configured for accessing the user interfaces illustrated in FIG. 11A-11C. For example, a Search Key 1150 may be configured for finding and subscribing to additional External Logs 1140.

Some embodiments of Computing Device 110A further include Analysis Logic 169. Analysis Logic 169 is configured to generate user profile data based, at least in part, on the user's Log 1130. For example, a user's profile may include a summary of the type of content the user likes based on tags and/or other characterizations of shared data within the user's Log 1130. The profile can be based on shared object type, tags provided by other users, tags provided using image recognition, shared object classification, likes of shared data, and/or the like. Analysis Logic 169 can be located on Computing Device 110A and/or Server 195. Likewise, the user profile generated using Analysis Logic 169 can be stored in Storage 165 and/or a Storage 197 of Server 195. In an illustrative example, Analysis Logic 169 may be used to note that the user often uses objects related to love and relationships, or that the user often likes objects in external logs related to video games. These observations can be noted in the user's profile as factors characterizing the user.

In some embodiments, Computing Device 110A includes Advertising Logic 162. Advertising Logic 162 is configured to select advertisements for presentation to a user of Computing Device 110A on Display 130. The selection can be based on a wide variety of factors including a user's profile, location information, the identity of Base Application 120A and/or Dependent Application 125, the identity of shared data, content of text messages and/or other communications, information provided by the user (e.g., age, gender and interests), and/or the like. For example, advertisements may be selected based on an analysis of shared data performed using Analysis Logic 169. Advertisements may be inserted in a log of shared data, in an input stream received from a device external to Computing Device 110A, and/or presented elsewhere on a virtual user interface. For example, in some embodiments an advertisement includes text, an image included in a shard data log, and/or an advertising shortcut key on a virtual keyboard. In some embodiments, advertisement are included in an instance of Log 1130 that is shared to other Computing Devices 110 using Upload Logic 167.

The advertisement is typically configured for accessing further advertising content when selected. The further advertising content can include, for example, a web resource, images, audio, video, websites, etc. The advertisement may be configured for executing a local or remote application, opening a browser to a specific URL, opening a download site, and/or the like. The advertisement may be presented within a virtual keyboard. Advertising Logic 162 is optionally configured to select the functionality of an advertisement, i.e., the action(s) taken when the advertisement is selected. The functionality may be dependent on information within the user's profile.

In some embodiments Advertisement Logic 162 is configured to select advertisements based on data stored on Computing Device 110A. This feature can be used to preserve privacy. For example, the content of text messages or e-mail may be considered too private to communicate to Server 195. In this case, Advertisement Logic 162 may use this private information on Computing Device 110A to select between alternative advertisements already present on Computing Device 110A, without unnecessarily communicating the private information from Computing Device 110A.

In some embodiments, advertisements are provided from Server 195, or some other remote location, to Computing Device 110A in an encrypted form. The advertisements are then decrypted on Computing Device 110A prior to presentation to a user on Display 130. The decryption may make use of a public/private key pair and may serve to both authenticate and prevent unauthorized corruption of advertisements.

Computing Device 110A optionally further includes Network Discovery Logic 161. Network Discovery Logic 161 is configured to map a network of a user based on sharing of data communicated via Base Applications 120 and Dependent Applications 125. Specifically, Network Discovery Logic 161 may be configured to map a network of a user based on a Log 1130 of the user. The generated map includes data representative the other parties with whom a user communicates. The map shows links between the user and others users. As noted elsewhere herein, this map can be an inter-network map that includes parts of multiple existing social networks. For example, the map generated by Network Discovery Logic 161 can include third parties in a user's Facebook network, their LinkedIn network, their WhatsApp network and also their Snapchat network. The inter-network map is optionally used to identify users to invite to specific networks or to discover further characteristics of the user.

Computing Device 110A optionally further includes Stream Logic 163. Stream Logic 163 is configured to provide an input stream of data from local or external logs (e.g., from Log 1130 or External Logs 1140) to a user interface such as those illustrated in FIGS. 11A-11C. Stream Logic 163 is optionally an instance of Dependent Application 125. The provided logs include selectable objects capable of being provided from the input fields of Base Applications 120 for communication to remote computing devices. The external logs provided using Stream Logic 163 typically include those external logs to which a user has subscribed using Setup Logic 160.

FIG. 12 illustrates methods of creating a log, according to various embodiments of the invention. The log is created by sharing content using Base Applications 120 and Dependent Applications. Execute Base Application 810, Retrieve Adapted Interface 815 are executed as described elsewhere herein. In a Receive Selection 1217 a selection of a shortcut key is received. The selected shortcut key is a member of a plurality of shortcut keys included in a first user interface displayed in a base application. The selection is typically made by a user touching Display 130 or clicking using a mouse.

Replace Interface Step 820, Receive Input Step 825, Pass Input Step 830, Process Input Step 835 and Provide Output Step 840 are executed as described elsewhere herein. In Provide Output Step 840 the output of a member of Dependent Applications 125 is provided to an input field of one of Base Applications 120.

In a Log Output Step 1245 the provided output and optionally any associated metadata is placed in Log 1130. The log is optionally stored in Storage 165 or Storage 197. If this is the first entry in Log 1130 then Log Output Step 1245 may include creation of the log. For example, Log 1130 may include data representative of the output of Dependent Application 125A. Log 1130 may include data representing outputs of multiple members of Dependent Applications 125, each of the outputs having been provided to the input field of one of Base Applications 120

Steps 1217 through 1245, and the entire method illustrated, are optionally repeated to add further entries to Log 1130. The steps may be repeated with different members of Base Applications 120 and/or Dependent Applications 125.

In an optional Communicate Log Step 1250, Log 1130 is communicated to one or remote devices using I/O 170 and Network 115. The remote devices can include Computing Device 110B and/or Server 195.

FIG. 13 illustrates methods of receiving External Logs 1140, according to various embodiments of the invention. A user can select which of External Logs 1140 they wish to subscribe to. The External Logs 1140 can include logs generated at other members of Computing Devices 110 and/or logs generated at Server 195. The logs generated at Server 195 may be generated and managed by Stream Management Logic 196. They may include the most popular elements within user generated logs, logs of objects selected based on a classification, logs based on special events, logs configured for use in a specific geographic region, and/or the like. The External logs optionally include advertisements inserted by Stream Management Logic 196.

Execute Base Application 810, Retrieve Adapted Interface Step 815, Receive Selection Step 1217, Replace Interface Step 820, Receive Input Step 825, Pass Input Step 830 and Process Input Step 835 are executed as described elsewhere herein.

In a Receive Log Element Step 1335 data representative of an object within one of the selected External Logs 1140 is received in response to processing in Process Input Step 835. This data optionally becomes an output of one of Dependent Applications 125.

In a Provide Element Step 1340, the data/object received in Receive Log Element Step 1135 is provided to an input field of one of Base Applications 120A.

In a Send Element Step 1345 the data/object is sent to a remote computing device such as Computing Device 110B and/or Server 195 using the communication features of Base Application 120A or 120B.

In an Optional Update Metadata Step 1350, metadata associated with the data/object is updated. The update can occur on Computing Device 110A and/or Server 195. For example, in some embodiments, Update Metadata Step 1350 includes sending an update counter command from Computing Device 110A to Server 195. At Server 195 the command is used to update a count of how often the data/object has been shared. Update Metadata Step 1350 may occur before the object is sent or provided in Steps 1340 or 1345.

Several embodiments are specifically illustrated and/or described herein. However, it will be appreciated that modifications and variations are covered by the above teachings and within the scope of the appended claims without departing from the spirit and intended scope thereof. For example, while a messaging application is illustrated in some of the examples provided, the concepts disclosed can be applied to other types of application including those in which a default interface is not a keyboard interface. The data discussed here in can include a wide variety of data including text data, binary data, image data, metadata, audio data, formatting data, command data, and/or the like.

The discussion herein regarding games may also apply to any other group activities. For example, group editing sessions, conferences/chats, auctions, image sharing, content sharing, and/or the like. Further, the self-propagation of applications by sharing a link configured to provision that application on a remote computing device is not restricted to sharing using a virtual keyboard or Adapted User Interface 220. Specifically, an application may itself be configured to send a link via an instance of Base Application 120A to a remote device, the link being configured for provisioning the application on the remote device. While many of the examples provided herein include input fields of Base Application 120A that are configured to receive text data, in alternative embodiments, the inputs provided to Base Application 120A can include images, video, audio, and/or other data types.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The logic discussed herein includes hardware, firmware and/or software stored on a non-transient computer readable medium. This logic may be implemented in an electronic device to produce a special purpose computing system.

What is claimed is:

1. A method of executing an application, the method comprising:
    selecting a first application from a plurality of third-party applications;
    adapting a user interface of the first application for execution of the first application from within a base application;
    selecting a second application from the plurality of third-party applications;
    adapting a user interface of the second application for execution of the second application from within the base application;
    adapting a default interface of the base application to include a shortcut icon to the first application and a shortcut icon to the second application, the adapted default interface including a first text editing field configured for receiving text;
    replacing the default interface of the base application with the adapted default interface including the shortcut icons to the first and second applications;
    receiving a selection of the shortcut icon to the first application at the adapted default interface;
    executing the first application in response to receiving the selection of the shortcut icon to the first application; and
    replacing at least part of the adapted default interface of the base application with the adapted user interface of the first application, the replacement occurring in response to the execution of the first application, wherein the adapted user interface of the first application is configured for copying an output of the first application into the first text editing field of the adapted default interface, the output being configured for performing a financial transaction;
    wherein the shortcut icon of the first application includes an advertisement key, the advertisement key being configured for downloading an application to a mobile device via a network.

2. The method of claim 1, further comprising provisioning keyboard logic on a mobile device, the keyboard logic being configured for replacing the default interface of the base application with the adapted default interface.

3. The method of claim 1, wherein the base application is a text messaging application.

4. The method of claim 1, wherein the advertisement key is configured to share advertising content from a computing device to remote computing devices via the base application, the base application including a messaging application.

5. The method of claim 1, further comprising using logging logic to generate a log of data received from the first application and transferred to a remote device using the base application.

6. The method of claim 1, further comprising receiving external logs from a remote device and presenting these external logs within the adapted user interface of the base application, the external logs including logs of content shared by third parties using the base application.

7. The method of claim 1, wherein the adapted default interface of the base application includes a virtual keyboard.

8. The method of claim 7, wherein the adapted user interface of the first application is a non-keyboard user interface.

9. The method of claim 1, wherein the output of the first application includes a link configured for purchasing a product or service.

10. The method of claim 1, wherein the first application is executed on the mobile device and setup logic is used to select the first application from the plurality of third party applications.

11. The method of claim 1, wherein both the first application and the base application are configured to independently execute on a same operating system.

12. The method of claim 1, wherein the first application includes an HTML shell configured to display a webpage within the adapted user interface of the first application.

13. The method of claim 1, wherein the adapted default interface of the base application includes at least one functional call to the first application.

14. The method of claim 1, wherein the adapted user interface of the first application is adapted to fit within a display area occupied by the adapted default interface of the base application.

15. The method of claim 1, further comprising using data transfer logic to transfer data from the adapted user interface of the first application to the adapted user interface of the base application.

16. The method of claim 1, wherein the adapted default interface of the base application includes a shortcut icon configured for copying a link into the text editing field of the base application, wherein the link is configured for provisioning a virtual keyboard on a mobile device.

17. The method of claim 1, wherein the financial transaction includes purchase of a product or service.

18. The method of claim 1, wherein the advertisement key is configured to open the application store or to access the website to complete the financial transaction.

19. The method of claim 1, wherein the adapted user interface of the first application includes a second text editing field configured to receive input to the first application.

20. A method of executing an application, the method comprising:
    selecting a first application from a plurality of third-party applications;
    adapting a user interface of th first application for execution of the first application from within a base application;
    selecting a second application from the plurality of third-party applications;
    adapting a user interface of the second application for execution of the second application from within the base application;
    adapting a default interface of the base application to include a shortcut icon to the first application and a shortcut icon to the second application, the adapted default interface including a first text editing field configured for receiving text,
    replacing the default interface of the base application with the adapted default interface including the shortcut icons to the first and second applications;
    receiving a selection of the shortcut icon to the first application at the adapted default interface;
    executing the first application in response to receiving the selection of the shortcut icon to the first application; and
    replacing at least part of the adapted default interface of the base application with the adapted user interface of the first application, wherein the adapted user interface of the first application is configured for copying an output of the first application into the first text editing field of the adapted default interface, the output being configured for performing a financial transaction;
    wherein the adapted default interface of the base application includes a shortcut icon configured for copying a link into the text editing field of the adapted default interface of the base application, wherein the link is configured for downloading and installing a member of the plurality of third-party applications on a mobile device.

21. A method of executing an application, the method comprising:
    selecting a first application from a plurality of third-party applications;
    adapting a user interface of the first application for execution of the first application from within a base application;
    selecting a second application from the plurality of third-party applications;
    adapting a user interface of the second application for execution of the second application from within the base application;
    adapting a default interface of the base application to include a shortcut icon to the first application and a shortcut icon to the second application, the adapted default interface including a first text editing field configured for receiving text;
    replacing the default interface of the base application with the adapted default interface including the shortcut icons to the first and second applications;
    receiving a selection of the shortcut icon to the first application at the adapted default interface;
    executing the first application in response to receiving the selection of the shortcut icon to the first application; and
    replacing at least part of the adapted default interface of the base application with the adapted user interface of the first application, the replacement occurring in response to the execution of the first application, wherein the adapted user interface of the first application is configured for copying an output of the first application into the first text editing field of the adapted default interface, the output being configured for performing a financial transaction;
    wherein the output of the first application includes a ling configured to download a third-party application to a mobile device, and using the base application to communicate the link via a text message over a communication network.

22. The method of claim 21, further comprising pasting the link into the text editing field of the adapted default interface using the shortcut icon to the first application.

23. The method of claim 22, wherein the link is to a webpage.

24. The method of claim 21, wherein the adapted default interface of the base application includes a shortcut icon configured for copying the link into the text editing field of the adapted default interface of the base application, wherein the link is configured for provisioning a member of the plurality of third-party applications on a mobile device.

25. The method of claim 21, wherein the link is configured to open an application store or to access a website.

26. The method of claim 21, wherein the shortcut icon of the first application includes an advertisement key, the advertisement key being configured to present content within a virtual keyboard.

27. The method of claim 21, wherein the shortcut icon of the first application includes an advertisement key, the advertisement key being configured to present advertising content in the adapted default interface of the base application.

28. The method of claim 21, wherein the output of the first application includes a coupon, a payment or a discount code.

29. The method of claim 21, further comprising using advertising logic to place an advertising key in the adapted interface of the base application.

30. The method of claim 29, further comprising selecting functionality of the advertising key based on a user profile.

31. The method of claim 21, wherein the shortcut icon of the first application includes an advertisement key, the advertisement key being configured for sharing of an advertisement using the base application.

32. The method of claim 21, wherein the adapted user interface of the first application includes a second text editing field configured to receive input to the first application.

\* \* \* \* \*